United States Patent
Hao et al.

(10) Patent No.: US 8,931,016 B2
(45) Date of Patent: Jan. 6, 2015

(54) PROGRAM HANDOFF BETWEEN DEVICES AND PROGRAM NETWORK OFFLOADING

(75) Inventors: Jack Jianxiu Hao, Lexington, MA (US); Yuhui Qian, Lexington, MA (US); Jian Huang, Sudbury, MA (US); Gaurav Mehta, Brookline, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 96 days.

(21) Appl. No.: 13/233,543

(22) Filed: Sep. 15, 2011

(65) Prior Publication Data

US 2013/0074125 A1 Mar. 21, 2013

(51) Int. Cl.
- *H04N 7/16* (2011.01)
- *H04N 21/433* (2011.01)
- *H04N 21/436* (2011.01)
- *H04N 21/41* (2011.01)
- *H04W 4/14* (2009.01)
- *H04W 4/20* (2009.01)

(52) U.S. Cl.
CPC ........... *H04W 4/203* (2013.01); *H04N 21/4333* (2013.01); *H04N 21/43615* (2013.01); *H04N 21/4122* (2013.01); *H04W 4/14* (2013.01)
USPC ................... 725/62; 725/142; 725/83; 725/85

(58) Field of Classification Search
CPC ..................... H04N 21/4126; H04N 21/41407; H04N 21/44004; H04H 20/57
USPC ......................................................... 725/62
See application file for complete search history.

(56) References Cited

U.S. PATENT DOCUMENTS

| | | | |
|---|---|---|---|
| 5,410,740 A * | 4/1995 | Hagstrom ................... | 455/67.11 |
| 5,428,816 A * | 6/1995 | Barnett et al. ................ | 455/437 |
| 6,950,656 B1 * | 9/2005 | Bahk et al. .................... | 455/436 |
| 7,386,296 B2 * | 6/2008 | Karaoguz et al. ............. | 455/408 |
| 7,440,430 B1 * | 10/2008 | Jagadeesan et al. .......... | 370/331 |
| 7,447,181 B1 * | 11/2008 | Forssell ....................... | 370/336 |
| 7,562,146 B2 * | 7/2009 | Panasyuk et al. ............. | 709/227 |
| 7,623,493 B2 * | 11/2009 | Baba et al. .................... | 370/331 |
| 7,895,629 B1 * | 2/2011 | Shen et al. ....................... | 725/62 |
| 7,936,719 B2 * | 5/2011 | Fajardo et al. ................ | 370/331 |
| 2001/0038616 A1 * | 11/2001 | Fong et al. ................... | 370/329 |
| 2002/0142774 A1 * | 10/2002 | Saint-Hilaire et al. ......... | 455/445 |
| 2003/0103479 A1 * | 6/2003 | Anderson et al. ............. | 370/335 |
| 2004/0203783 A1 * | 10/2004 | Wu et al. ....................... | 455/436 |
| 2005/0078636 A1 * | 4/2005 | Zhang et al. .................. | 370/331 |
| 2005/0080907 A1 * | 4/2005 | Panasyuk et al. ............. | 709/228 |
| 2005/0243870 A1 * | 11/2005 | Balogh et al. ................. | 370/522 |
| 2006/0018309 A1 * | 1/2006 | Lee et al. ....................... | 370/355 |
| 2006/0221900 A1 * | 10/2006 | Zhang et al. .................. | 370/331 |
| 2007/0014259 A1 * | 1/2007 | Fajardo et al. ................ | 370/331 |
| 2007/0019670 A1 * | 1/2007 | Falardeau ..................... | 370/465 |
| 2007/0021138 A1 * | 1/2007 | Allen et al. ................... | 455/518 |

(Continued)

*Primary Examiner* — James R Sheleheda
*Assistant Examiner* — Timothy Newlin

(57) ABSTRACT

Methods, devices, and non-transitory storage mediums provide a program handoff between user devices. The program handoff permits a user to select a user device with which to resume a playing of the program. The program handoff also permits a user to set a reminder for playing the program. Methods, devices, and non-transitory storage mediums provide for an application layer-based network offloading of programs. A program is buffered based on a network offloading time and the program is played from a buffer during an execution of a network offload. Network offload prediction is used to minimize network offload time and buffering.

20 Claims, 20 Drawing Sheets

(56) References Cited

U.S. PATENT DOCUMENTS

| | | |
|---|---|---|
| 2007/0280154 A1* | 12/2007 | Gupta et al. .................. 370/328 |
| 2008/0089293 A1* | 4/2008 | Madour et al. ................ 370/331 |
| 2008/0132235 A1* | 6/2008 | Hancock et al. .............. 455/436 |
| 2009/0203394 A1* | 8/2009 | Shaffer et al. ................. 455/525 |
| 2009/0219892 A1* | 9/2009 | Kim et al. ..................... 370/332 |
| 2010/0215021 A1* | 8/2010 | Li et al. ......................... 370/331 |
| 2010/0296476 A1* | 11/2010 | Li et al. ......................... 370/329 |

\* cited by examiner

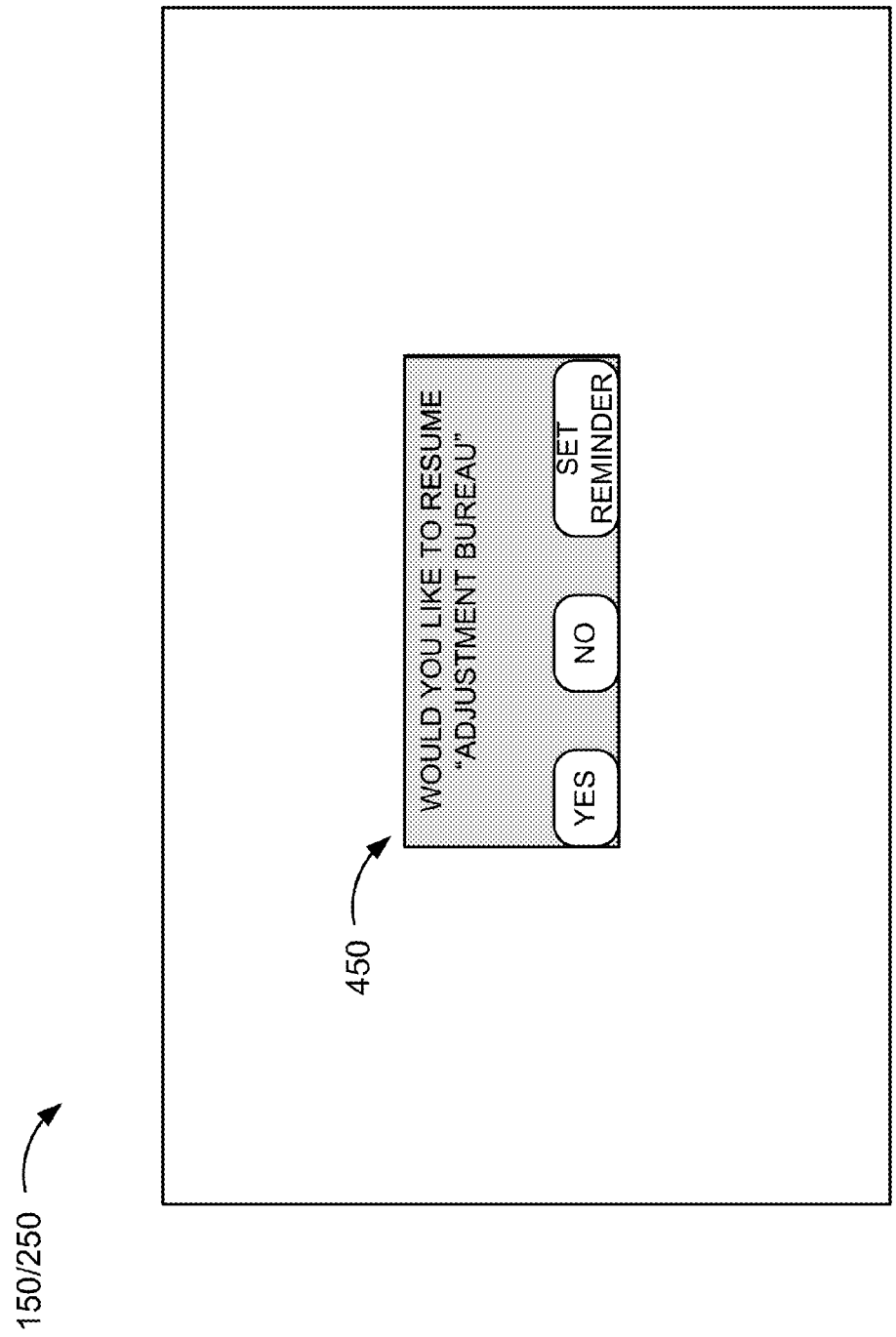

PROGRAM HANDOFF BETWEEN DEVICES AND PROGRAM NETWORK OFFLOADING

BACKGROUND

Mobile devices, such as mobile phones, smart phones, tablets, and other portable devices, are pervasive among users. As a result, service providers and network providers continue to strive to improve wireless services, in terms of types of service (e.g., location-aware services, multimedia services, etc.), access, performance, etc. Given the growing demand for wireless service, wireless bandwidth is gradually becoming a precious commodity.

In addition to mobile devices, user devices also include stationary devices, such as desktop computer, televisions, etc. Given the diversity of user devices, service providers and network providers strive to extend various services among the array of user devices available to users.

BRIEF DESCRIPTION OF THE DRAWINGS

FIG. 4B is a diagram illustrating an exemplary graphical user interface pertaining to a program resume prompt;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "program," as used herein, includes video content. For example, the program may be television video content (e.g., a movie, a television show, pay-per-view content, video-on-demand content, etc.) or Internet content (e.g., a webcast, a videocast, a podcast, etc.).

Figure 1:
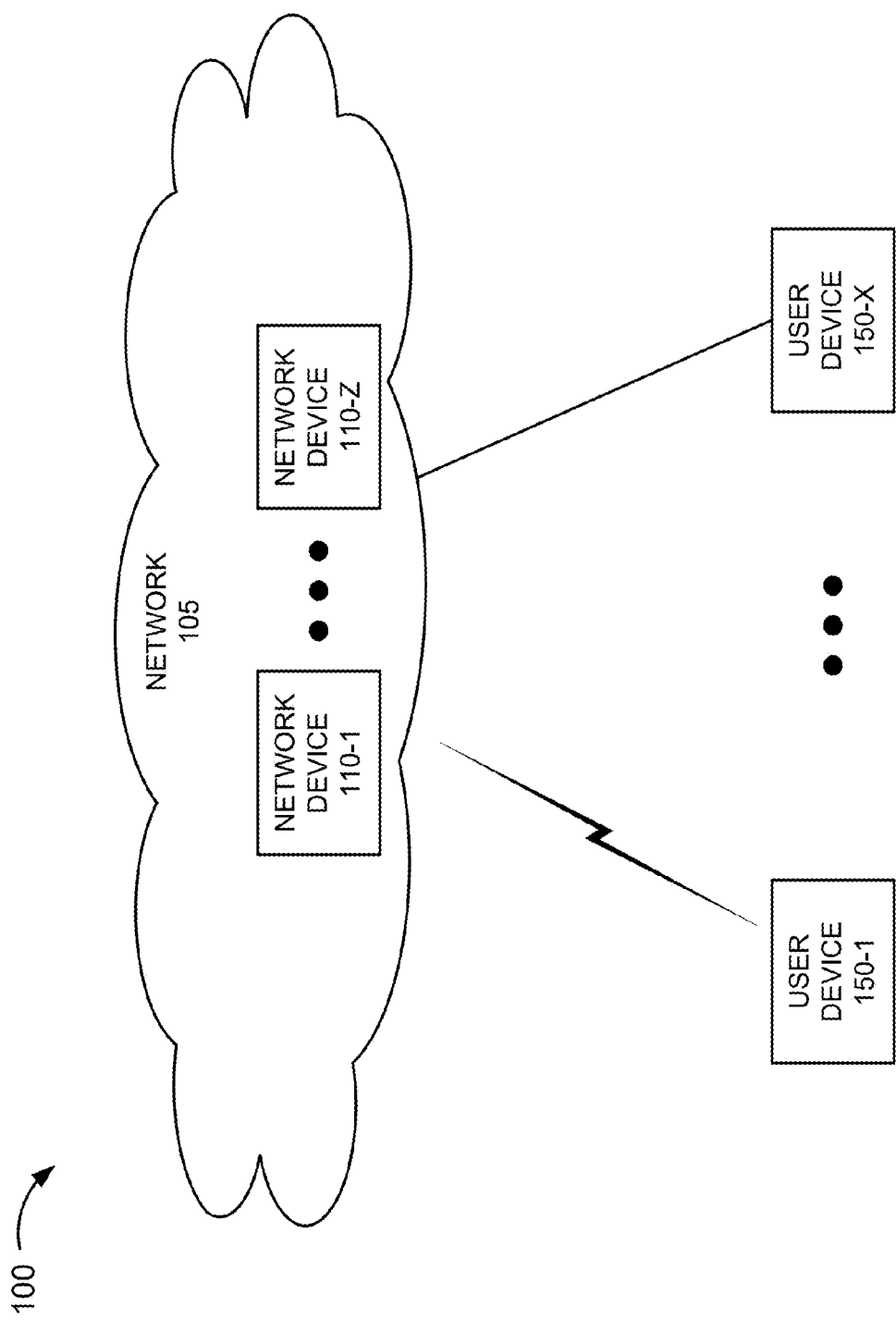
FIG. 1 is a diagram illustrating an exemplary environment in which an exemplary embodiment for program handoff between user devices may be implemented.

FIG. 1 is a diagram illustrating an exemplary environment in which an exemplary embodiment for program handoff between user devices may be implemented. As illustrated, environment 100 includes a network 105 having network devices 110-1 through 110-Z, in which Z>1 (referred to collectively as network devices 110 or individually as network device 110), and user devices 150-1 through 150-X, in which X>1, (referred to collectively as user devices 150 or individually as user device 150). Environment 100 may include wired and/or wireless connections among the devices and network illustrated.

The number of devices and networks, and the configuration in environment 100 are exemplary and provided for simplicity. According to other embodiments, environment 100 may include additional devices, fewer devices, different devices, and/or differently arranged devices, than those illustrated in FIG. 1.

According to other embodiments, a single device may be implemented as multiple devices and/or multiple devices may be implemented as a single device. A device may be implemented according to a centralized computing architecture or a distributed computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices. By way of example, one or more functions and/or processes described as being performed by network device 110 may be performed by user device 150, or vice versa, or in combination.

Network 105 includes one or multiple networks. For example, network 105 may include a mobile network that provides a mobile service or permits users access to a mobile service. Network 105 may include a television network that provides a television service or permits users access to a television service. Network 105 may include a network that provides Internet service or permits access to the Internet. Network 105 may include other types of wired and/or wireless networks, such as, for example, a WiFi network, a local area network (LAN), the Internet, etc.

User device 150 includes a device having the capability to communicate with other devices, systems, networks, and/or the like. For example, user device 150 may be implemented as a smartphone, a computer (e.g., a laptop, a palmtop, a desktop, a tablet, etc.), a personal digital assistant (PDA), a personal communication system (PCS) terminal, a pervasive computing device, a video playing device, a game system, or some other type of mobile device (e.g., a vehicle-based communication system, etc.). User device 150 may also include, for example, a television and a set top box. The term "set top box" may include, for example, a client device, a thin client device, a converter box, a television receiver, a tuner device, a digibox, or some other type of device that receives program signals (e.g., television programs, Internet content, etc.). Additionally, user device 150 may include a monitor or a display, a remote control device, a DVD player, a Blu-ray® player, etc.

According to an exemplary embodiment, a program handoff service permits a user to watch a program on one user device (e.g., user device 150-1) and resume watching the program on another user device (e.g., user device 150-X). According to an exemplary embodiment, a user registers user devices 150 with network 105 (e.g., with network device 110) for receiving program handoff services.

According to an exemplary embodiment, user device 150 records the location of the program when the user wishes to stop watching the program. For example, the user may stop or pause the playing of a program, or quit or exit an application that plays the program. According to another embodiment, network device 110 may record the location of the program. According to an exemplary embodiment, the user is prompted to select a user device 150 at which the program is going to be resumed. The user may select any user device 150 that is registered.

Upon selection of another user device 150, according to an exemplary embodiment, network 105 may prepare the other user device 150 for resuming the program. By way of example, network 105 may transmit a message to the other user device 150. According to an exemplary embodiment, in response to the message, the other user device 150 may display a prompt to allow the user to resume the program. In this way, the user may not have to manually navigate to a particular application or menu, manually launch an application, navigate to and select the program, etc. Rather, when the user accepts the prompt to resume the playing of the program, the program may resume. Depending on the other user device 150, the resume process may include, for example, automatically launching a program player (e.g., a media player), tuning to a particular channel, launching a web browser or a new tab of a web browser.

According to exemplary embodiment, the program handoff service permits a user to share a program with another user. For example, the user may indicate a start point and a stop point in the program or a start point in the program via user device 150. This location(s) is/are bookmarked by network device 110 or by user device 150. The user may select a recipient. For example, the user may select a friend from an address book or a social network. User device 150 may generate a message that includes a link to obtain the bookmark information and transmits the message to the friend's user device 150. Alternatively, the message may include the bookmark information. Upon receipt of the message, the friend may then begin to play the program based on the bookmarked information.

Figure 2:
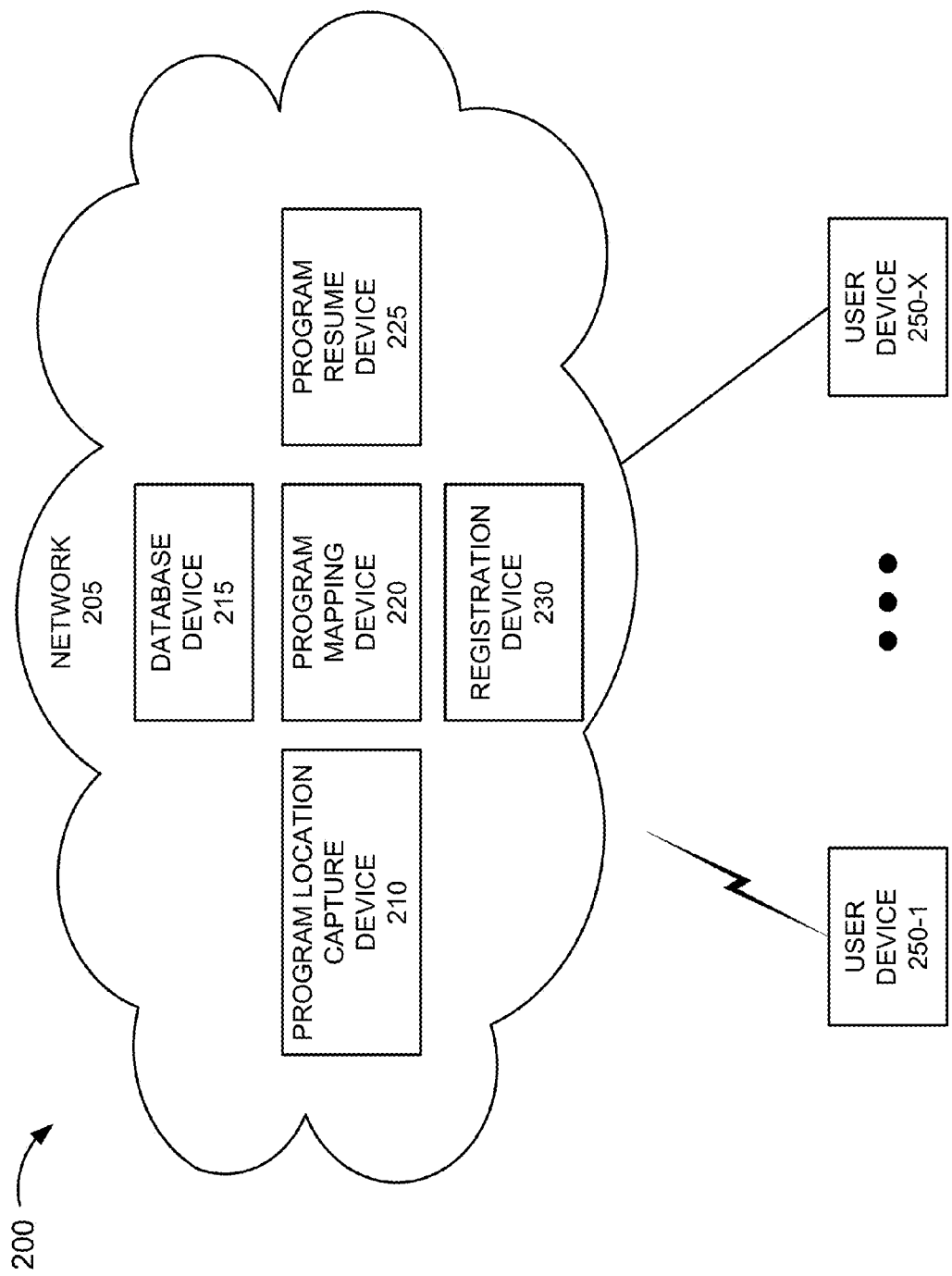
FIG. 2 is a diagram illustrating another exemplary environment in which an exemplary embodiment for program handoff between user devices may be implemented.

FIG. 2 is a diagram illustrating another exemplary environment in which an exemplary embodiment for program handoff between user devices may be implemented. As illustrated, environment 200 includes a network 205 that includes a program location capture device 210, a database device 215, a program mapping device 220, a program resume device 225, and a registration device 230.

Network 205 may include one or multiple networks. Network 205 may include network(s) similar to that previously described with respect to network 105.

Program location capture device 210 includes a network device that identifies the location of a program at the point when a user pauses, stops, quits, exits, etc., the playing of the program on user device 250. According to an exemplary embodiment, the location is identified by a playing time from the beginning of the program to the pause point, stop point, etc. According to another exemplary embodiment, the location is identified based on the segmentation of the program. For example, the program may be segmented and indexed into program chunks, files, or byte range. According to other embodiments, other techniques known in the art may be used. Program location capture device 210 may be implemented, for example, as a computer, a server device (e.g., an application server, a web server), or other suitable computational device.

Database device 215 includes a network device that stores data and/or information. Database device 215 may include databases (e.g., a relational database, a distributed database, or other type of suitable database) pertaining to the program handoff service. For example, database device 215 may include a database that stores program location information. Database device 215 may include a database that stores program mapping information. For example, the program format for one user device 250 (e.g., a television) may be different than the program format for another user device 250 (e.g., a smartphone). The program mapping information may provide a mapping of a program between different formats. Database device 215 may also include a database that stores information pertaining to registered user devices 250 associated with a user. Database device 215 may be implemented as a computational device, such as, for example, a server or other form of database management system.

Program mapping device 220 includes a network device that maps a program location associated with one program format to a program location associated with another program format. Program mapping device 220 may be implemented as a computational device, such as, for example, a server, a computer, or other suitable network device.

Program resume device 225 includes a network device that manages and/or facilitates the resuming of a program by user device 250. For example, program resume device 225 may generate and transmit messages to user devices 250 that notify user devices 250 to resume the program. User device 250 is a device similar to user device 150.

Registration device 230 includes a network device that manages the registration of user devices 250. The registration information may be obtained when registration information is obtained from a user during a registration process, is obtained automatically when user device 250 connects to network 205, and/or is obtained from other interactions (e.g., an installation process of a service, etc.). The registration information may include, for example, a user device identifier (e.g., a name of a user device, an equipment identifier, a network address, etc.) and user device characteristics (e.g., an operating system, a display size, a display resolution, a make and/or model of the user device, program player being used, etc.). The registration information may also include a user name, user login information (e.g., password, etc.), and/or location information associated with a user device (e.g., work, home, etc.). When the registration information is obtained, registration device 230 stores the registration information and uses this information when providing program handoff services. For example, registration device 230 stores registration information in a database that correlates a user device and/or a user with program handoff services. Additionally, program mapping device 220 may use registration information for identifying an appropriate program format for a particular user device 250.

Figure 3A:
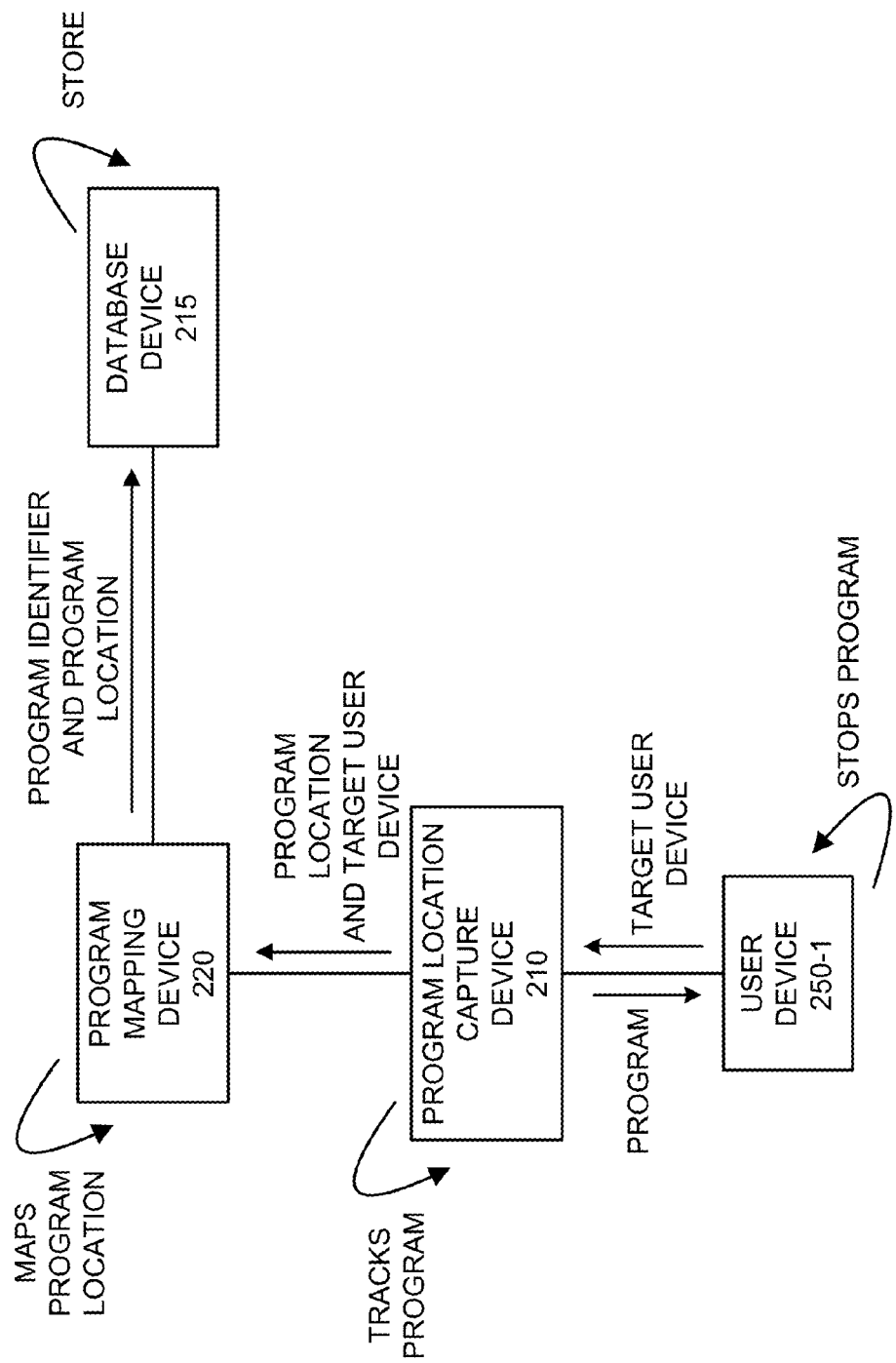
FIG. 3A is a diagram illustrating an exemplary process for capturing program location information.

Described below is an exemplary process for performing program handoff between user devices 250 in network 205. FIG. 3A is a diagram illustrating an exemplary process for capturing program location information. As previously described, according to other embodiments, multiple devices may be implemented as a single device. Additionally, according to other embodiments, as described further below, one or more operations may be performed by a different device, or some combination of devices.

According to this example, assume that user device 250-1 is receiving a program via program location capture device 210. It may be assumed that program location capture device 210 identifies the program location when a user stops, pauses, quits, etc., the viewing of a program.

Referring to FIG. 3A, in this example, program location capture device 210 tracks program segments (e.g., data segments) delivered to user device 250-1. For example, program location capture device 210 continuously tracks the user's program location and stores program tracking information. The program tracking information may include a program identifier (e.g., that identifies the program being delivered), a user identifier (e.g., that identifies the user and/or identifies user device 250-1 (e.g., an equipment identifier, a network address (e.g., a Media Access Control (MAC) address, etc.), etc.)), and a data file name or count number (e.g., associated with a program segment). According to an exemplary implementation, the program delivery or the playing of the program is based on Hypertext Transfer Protocol (HTTP) Live Streaming (HLS) or some other standard in which the program is segmented. According to other embodiments, program location capture device 210 can use other known techniques to track or obtain the location of the program based on the protocols and standards being implemented.

Figure 4A:
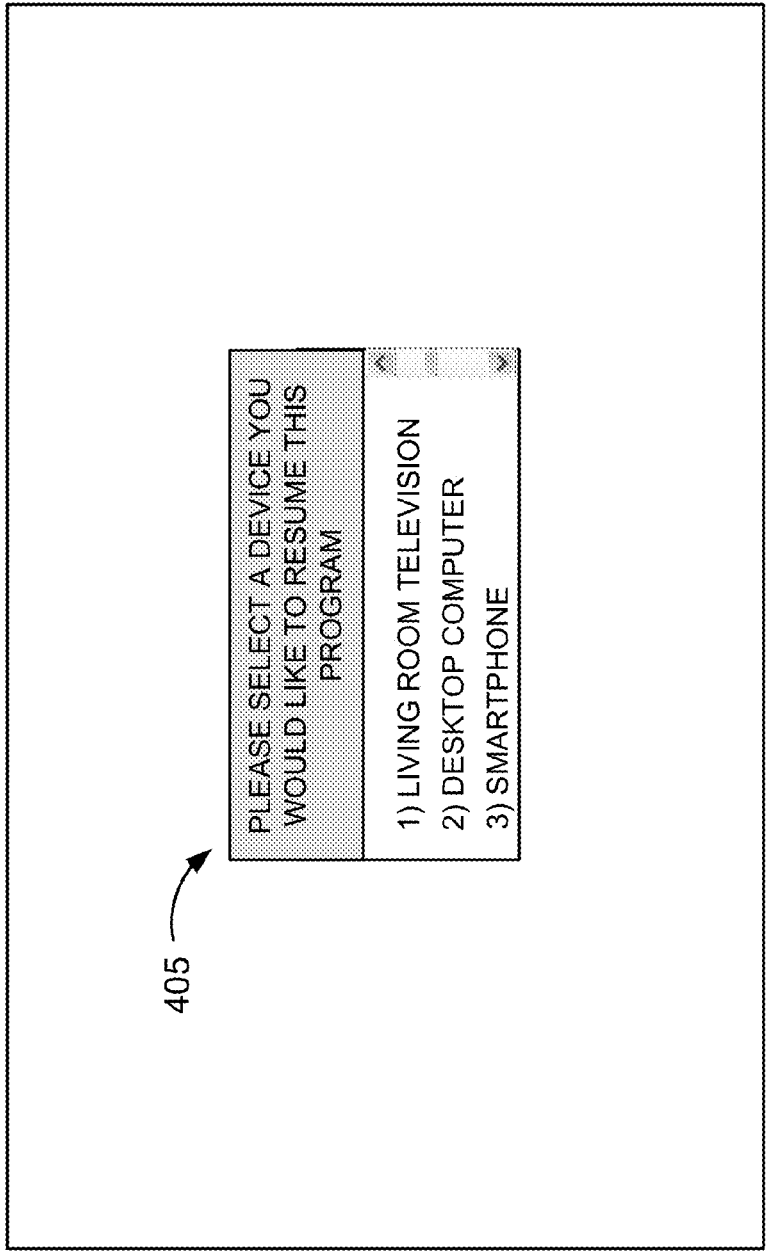
FIG. 4A is a diagram illustrating an exemplary graphical user interface pertaining to target user device selection.

In this example, assume the user stops the program via user device 250-1. Program location capture device 210 identifies the program location (e.g., minutes/seconds from a start point). Additionally, according to an exemplary embodiment, user device 250-1 displays a graphical user interface (GUI) that permits the user to indicate that the user would like to resume the program on another user device 250. If the user indicates that the user would like to resume the program on another user device 250, a graphical user interface permits the user to select the target user device 250 with which the user intends to resume the program. The graphical user interface may display user device(s) 250 registered with the program handoff service, the user, and/or the user's account. For example, as illustrated in FIG. 4A, an interactive element 405 is displayed to the user. Interactive element 405 includes a message to a user to select a device to resume the program and a list of devices from which the user may select. In this example, the list includes a living room television, a desktop computer, and a smartphone. According to this scenario, the user selects a device from interactive element 405.

As illustrated in FIG. 3A, user device 250-1 transmits the user selection pertaining to target user device 250 to program location capture device 210. Program location capture device 210 transmits the program location and target user device information to program mapping device 220. Depending on the user selected target user device 250, the program format of the program suitable for target user device 250 may be different from the program format of the program that was delivered to the user via user device 250-1. In this example, it is assumed that the program formats between user device 250-1 and target user device 250 are different. For example, user device 250-1 may be a desktop computer and target user device 250 may be a smartphone.

Program mapping device 220 may access a database that includes a mapping of program formats to user devices 250. The program mapping information may be generated based on registration information obtained during the registration process. For example, a user may identify the type of user device 250 (e.g., a smartphone, a desktop, a set top box, a television, etc.), make and/or model of user device 250 (e.g., Apple® iPhone 4 smartphone, Motorola® Droid 3 smartphone, etc.), capabilities of user device 250 (e.g., screen size, program player being used, etc.), connection speed, and/or other parameters relevant to the delivery and/or playing of programs. Additionally, user device information may be obtained absent a user registration process. For example, with reference to a television service, a service provider may supply the set top box to the user. In this regard, assuming the service provider also provides the program handoff service, the service provider may have information pertaining to the set top box, the television, etc. Additionally, with reference to Internet service and/or mobile service, the service provider may also have information pertaining to other user devices 250 used by the user for the program handoff service.

Based on the registration information and/or other user device-related information obtained by the service provider of the program handoff service, this information is correlated with program formats. Program mapping device 220 selects the appropriate program format. Thereafter, program mapping device 220 identifies the program location for the correlated program format based on the program location provided by program location capture device 210. In this example, program mapping device 220 stores a program identifier and the program location in database device 215. Program mapping device 220 may store other information, such as a user identifier and/or a target user device 250 identifier.

Figure 3B:
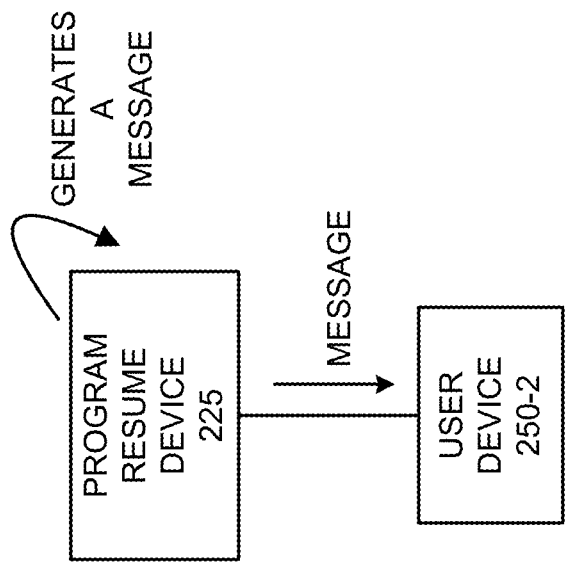
FIG. 3B is a diagram illustrating an exemplary process for resuming a program.

FIG. 3B is a diagram illustrating an exemplary process for resuming a program. In furtherance to a program handoff process, the captured program information is to be made available to a target user device 250 (e.g., user device 250-2), as illustrated. In this way, target user device 250-2 may resume the program.

According to an exemplary embodiment, network 205 (e.g., program resume device 225) generates a message based on the information stored by database device 215. For example, the message may be implemented as a wakeup message or other suitable message (e.g., a text message) that includes information to permit target user device 250-2 to resume the program. For example, the message includes a link to a network device (e.g., program location capturing device 210), a program identifier, and a program location. The message may include other information (e.g., user name, user login information, user credentials, etc.). The message may cause target user device 250-2 to perform operations directed to resuming the program, as described further below.

According to an exemplary implementation, a wake up message may be delivered to user device 250 as an SMS message. The wakeup message may include a prefix string to indicate it is an application-direct message. An application of target user device 250 may monitor for an incoming wakeup message and if the application identifies a receipt of the wakeup message that starts with a predefined prefix string, then the application processes the wakeup message and acts accordingly. The application-direct message may have several formats to accommodate different user devices 250.

According to an exemplary embodiment, target user device 250-2 includes an application to facilitate the resuming of the program. According to an exemplary implementation, the application may be implemented as a program player application (e.g., a media player application). According to another implementation, the application may be implemented as a client application. For example, the client application may obtain the link from the message, establish a network connection to the appropriate network device, and launch a program player application to allow the user to resume the program. The application may also perform other operations, such as generating an interactive element to permit the user to indicate that the user wishes to resume or not resume the program, as described further below. For example, the wakeup message may include several parameters pertaining to user choices (e.g., resume, start from the beginning, etc.) The application of target user device 250-2 processes the message and proposes actions from which the user may choose through an application user interface. The application may implement a default action if user does not respond to the message within a specified time period. For example, the default action may be to resume the program from where the last user device 250 stopped.

Depending on the state of target user device 250-2 and the type of target user device 250-2, the process of resuming the program may be different. For example, the state of target user device 250-2 may be that: it is turned off and not connected to network 205; it is turned on and connected to network 205, but in a sleep mode; it is turned on, in a normal mode, and connected to network 205; etc. Additionally, the type of target user device 250-2 (e.g., a smartphone, a desktop computer, a television, etc.) and the type of network or service (e.g., television, mobile, Internet) in which target user device 250-2 uses to resume the program may allow for different implementations pertaining to a program resume process. Described below are some exemplary scenarios pertaining to a program resume process.

Referring to FIG. 3B, it may be assumed that target user device 250-2 is a smartphone. According to an exemplary scenario, assume target user device 250-2 is not turned on and not connected to network 205. According to an exemplary embodiment, program resume device 225 may transmit a text message (e.g., a Short Messaging Service (SMS) message, an e-mail message, a Multimedia Messaging Service (MMS) message, etc.) to target user device 250-2. The text message is received by a message server. The message server stores the text message. When target user device 250-2 connects to network 205 (e.g., a mobile network), the SMS message or the MMS message is received by target user device 250-2. Alternatively, when the user opens an e-mail client application, target user device 250-2 receives the e-mail message. The user may open the text message and select a link (e.g., included in the text message) to connect to network 205 and resume the playing of the program.

According to another exemplary scenario, assume target user device 250-2 is turned on and connected to network 205. In a manner to that described above, program resume device 225 may transmit a text message to target user device 250-2 via a message server. Once the text message is received by target user device 250-2, the user may open the text message and select a link to connect to network 205 and resume the playing of the program.

According to another exemplary embodiment, program resume device 225 may transmit a message (e.g., a wakeup message). The wakeup message includes a link to a network device to permit target user device 250-2 to resume the program. The wakeup message may also cause an application to perform operations, as described below. For example, the application receives the wakeup message and treats the message as an application-direct message based on the prefix string. The application processes the wakeup message and presents the user with choices via an application user interface.

According to an exemplary scenario, it is assumed that target user device 250-2 is not connected to network 205. The wakeup message may be stored by a mobile message forwarding device (not illustrated). When target user device 250-2 connects to network 205, the mobile forwarding device is notified. The mobile forwarding device forwards the wakeup message to target user device 250-2. When the wakeup message is received, the wakeup message causes the target user device 250-2 to generate a notification to the user. For example, the notification may be implemented as an interactive element (e.g., an overlay, an icon, a graphical object, etc.). The user is prompted as to whether the user would like to resume the program. If the user indicates that the user would like to resume the program, target user device 250-2 resumes the program based on link information. The resume process on target user device 250-2 (e.g., a smartphone) may include launching a program player, establishing a program session, and resuming the playing of the program beginning at the program location. According to an exemplary embodiment, the user may not have to manually navigate and launch a program player, navigate and/or select the program to resume, etc. If the user indicates that the user would not like to resume the program, target user device 250-2 continues to operate in a normal mode and the program resume is dismissed. For example, as illustrated in FIG. 4B, an interactive element 450 is displayed. In this example, interactive element 450 requests confirmation from the user as to whether the user would like to resume the program (e.g., the movie "Adjustment Bureau"). The user may select "yes" to resume the program or "no" to not resume the program.

Figure 4C:
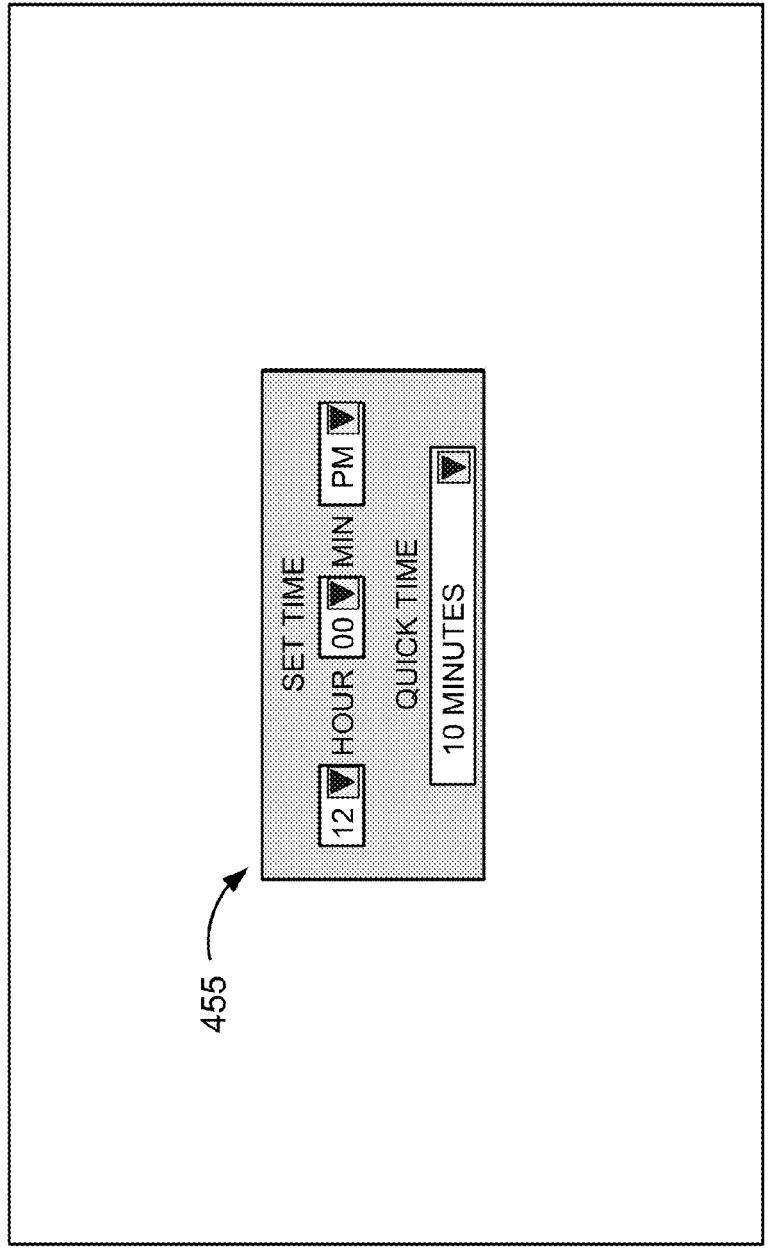
FIG. 4C is a diagram illustrating an exemplary graphical user interface pertaining to setting a reminder for a program resume.

According to another exemplary implementation, the user may be able to select a resume time. For example, assume the user views the notification but would like to first check e-mail or surf the Web. The interactive element may permit the user to create a reminder that will prompt the user to resume the program at a later time. The user may set a time for when the reminder occurs (e.g., 15 minutes from now, 30 minutes from now, an exact time (e.g., 2:00 p.m.), etc.). Upon the occurrence of the reminder, the user may resume the program, dismiss the reminder, or set another reminder. For example, referring to FIG. 4B, interactive element 450 may permit the user to set a reminder. As illustrated in FIG. 4C, the user may set a time (e.g., set an hour, minutes, a.m. or p.m.) for the program to resume or select a quick time setting (e.g., 10 minutes from now, 15 minutes from now, etc.) via an interactive element 455.

According to another exemplary scenario, when target user device 250-2 is connected to network 205, the wakeup message is forwarded to target user device 250-2. Similar to that previously described, when the wakeup message is received, target user device 250-2 generates a notification to the user. The user may resume the program, set a reminder, dismiss the notification, etc., as previously described.

According to another embodiment, when target user device 250-2 is another type of device, the resume process may be similar to that previously described. For example, referring back to FIG. 3B, program resume device 225 may transmit a wakeup message. In this example, it may be assumed that target user device 250-2 includes a set top box and a television. According to an exemplary implementation, when the set top box is not connected to network 205 (e.g., a television distribution network), the wakeup message is stored by a message forwarding device. When the set top box connects to network 205, the operations described below may be performed.

According to an exemplary implementation, when the set top box is connected to network 205 (e.g., a television distribution network), the wakeup message is received by the set top box. An application on the set top box receives the wakeup message and causes the set top box to generate an interactive element (e.g., an overlay, etc.). The interactive element is displayed on the television. The user may resume the program based on the user's interaction with the interactive element, set a reminder, etc.

If the user indicates to resume the program, the application on the set to box may cause the set top box to tune to an appropriate channel for receiving the program. The set top box may initiate a program session and resume the playing of the program from the program location. The user may not have to manually navigate through a menu, select the program to resume, etc.

According to another embodiment, the television may be connected to network 205. For example, some televisions may include a wireless communication interface (e.g., a Universal Serial Bus (USB) wireless transceiver) that permits access to the Internet via a wireless router or other type of access point. In this example, the television may include an application that is able to receive a wakeup message from program resume device 225. Similar to that previously described, the application receives the wakeup message and generates and displays an interactive element. If the user indicates that the user would like to resume the program, according to an exemplary implementation, the program may be resumed via the set top box. For example, the application may communicate with the set top box to establish a program session and resume the program at the program location.

Alternatively, according to another implementation, the program may be resumed not via the set top box, but via the wireless router or other type of access point. According to this implementation, the user may not have to manually navigate through a menu, select the program to resume, etc. The user may be able to set a reminder, etc., as previously described, via the interactive element.

According to another embodiment, when target user device 250-2 is yet another device, the resume process may be similar to that previously described. For example, referring back to FIG. 3B, program resume 225 may transmit a text message (e.g., an e-mail message) to target user device 250-2 via a messaging server (e.g., an e-mail server). The text message includes a link to connect to network 205 and resume the playing of the program. In this example, it may be assumed that target user device 250-2 includes a computer (e.g., a desktop computer). The user may open a text client application to open the text message. The user may resume the program by selecting the link in the text message.

According to another exemplary embodiment, program resume device 225 may transmit a message (e.g., a wakeup message) to target user device 250-2. When the wake-up message is received, an application on target user device 250-2 may generate and display an interactive element to permit the user to indicate whether to resume the program. If the user indicates to resume the program, a web browser or a new tab (e.g., if the web browser is already open) is launched and the program is resumed at the program location. According to an exemplary embodiment, the user may not have to manually navigate and launch a web browser, navigate and/or select the program to resume, etc. Similar to that previously described, if the user indicates not to resume the program, target user device 250 continues to operate in a normal mode and the program resume is dismissed. Additionally, the user may set a reminder.

Figure 3C:
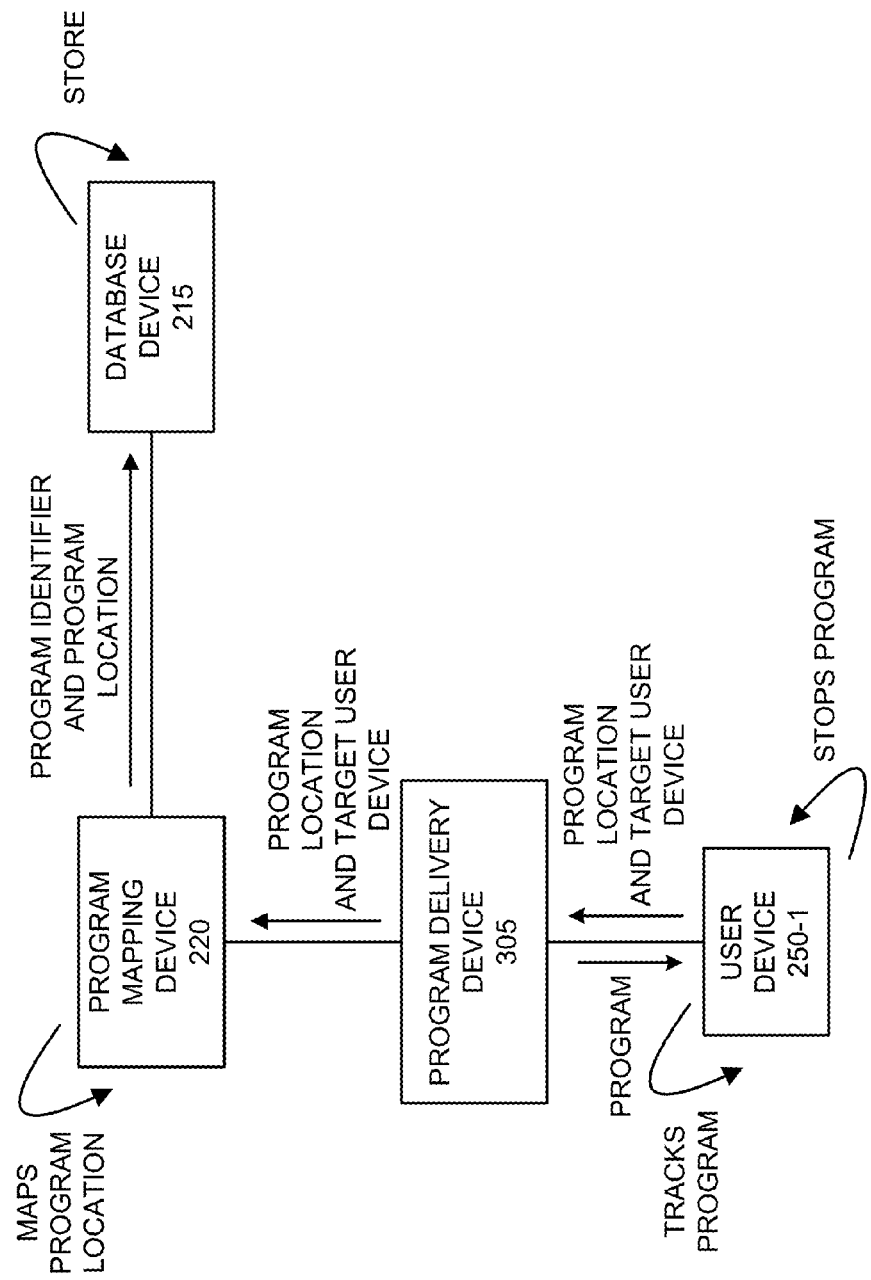
FIG. 3C is a diagram illustrating another exemplary process for capturing program location information.

FIG. 3C is a diagram illustrating another exemplary process for capturing program location information. In contrast to the process described in FIG. 3A, user device 250-1 captures the program location information. As illustrated in FIG. 3C, user device 250-1 receives the program via a program delivery device 305. Program delivery device 305 may include a network device, such a server, a computational device, or other suitable network device. Program delivery device 305 stores the program and is part of a program delivery network. User device 250-1 includes a program player (e.g., a media player). The program player or another application (e.g., a client application) has the intelligence to bookmark the location of the program in response to user action events (e.g., stop, pause, exit, quit, etc.). As an example, the program may be delivered to user device 250-1 using a streaming download (e.g., Real Time Streaming Protocol (RTSP), etc.) or a progressive download (e.g., HTTP progressive download, etc.).

In this example, assume the user stops the program via user device 250-1 and identifies the program location. Additionally, according to an exemplary embodiment, user device 250-1 may display a graphical user interface that permits the user to select the target user device 250 with which the user intends to resume the program.

As illustrated in FIG. 3C, user device 250-1 transmits the program location and target user device information to program mapping device 220. Similar to that previously described, program mapping device 220 may map the program location, etc., based on target user device 250-2 and store the program identifier and program location information in database device 215. Program mapping device 220 may store other information, such as a user identifier and/or a target user device 250 identifier.

Figure 3D:
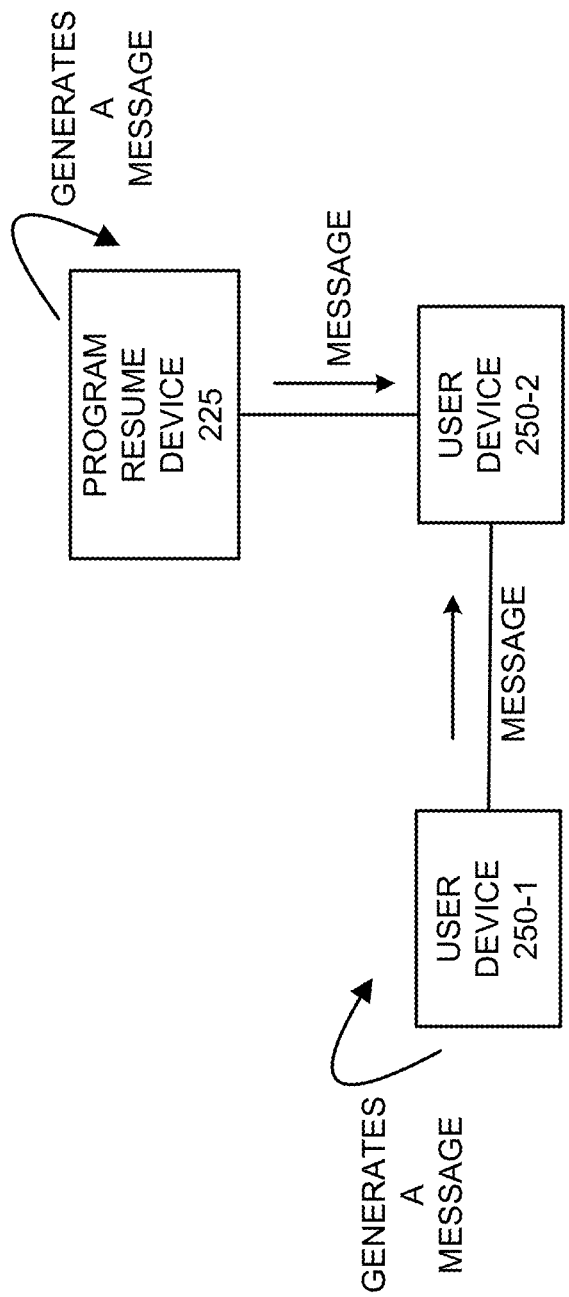
FIG. 3D is a diagram illustrating another exemplary process for resuming a program.

FIG. 3D is a diagram illustrating another exemplary process for resuming a program. According to an exemplary embodiment, program resume device 225 generates a message, such as a text message or a wakeup message. Program resume device 225 transmits the message and when target user device 250-2 receives the message, the message is processed as previously described. Alternatively, according to another embodiment, user device 250-1 transmits a message, such as a text message or a wakeup message. According to such an implementation, in the case that a program mapping is needed, user device 250-1 may communicate with a network device (e.g., program mapping device 220) to obtain the proper location or link to the program. Program mapping device 220 delivers the program location to the target user device via SMS (or a wakeup SMS), or email.

According to an exemplary embodiment, the program handoff service permits a user to share a particular portion of a program. For example, as previously described, the user may select a start point or a start point and a stop point pertaining to the program. In this way, the user may share with others (e.g., friends, family members, etc.) certain portions of a program (e.g., a favorite scene, etc.). For example, referring to FIG. 3C, user device 250-1 tracks the program. The user is aware of an upcoming scene that the user likes. The user selects a start point and an end point during the viewing of the program that corresponds to a scene of interest. The program locations corresponding to the start point and the end point are captured. According to other embodiments, the program tracking may be performed by program location capture device 210.

Referring to FIG. 3D, in this example, the user selects a friend's address. User device 250-1 generates a message and transmits the message to the friend's user device 250-2. User device 250-2 receives the message and the friend may play the program snippet.

Figure 5A:
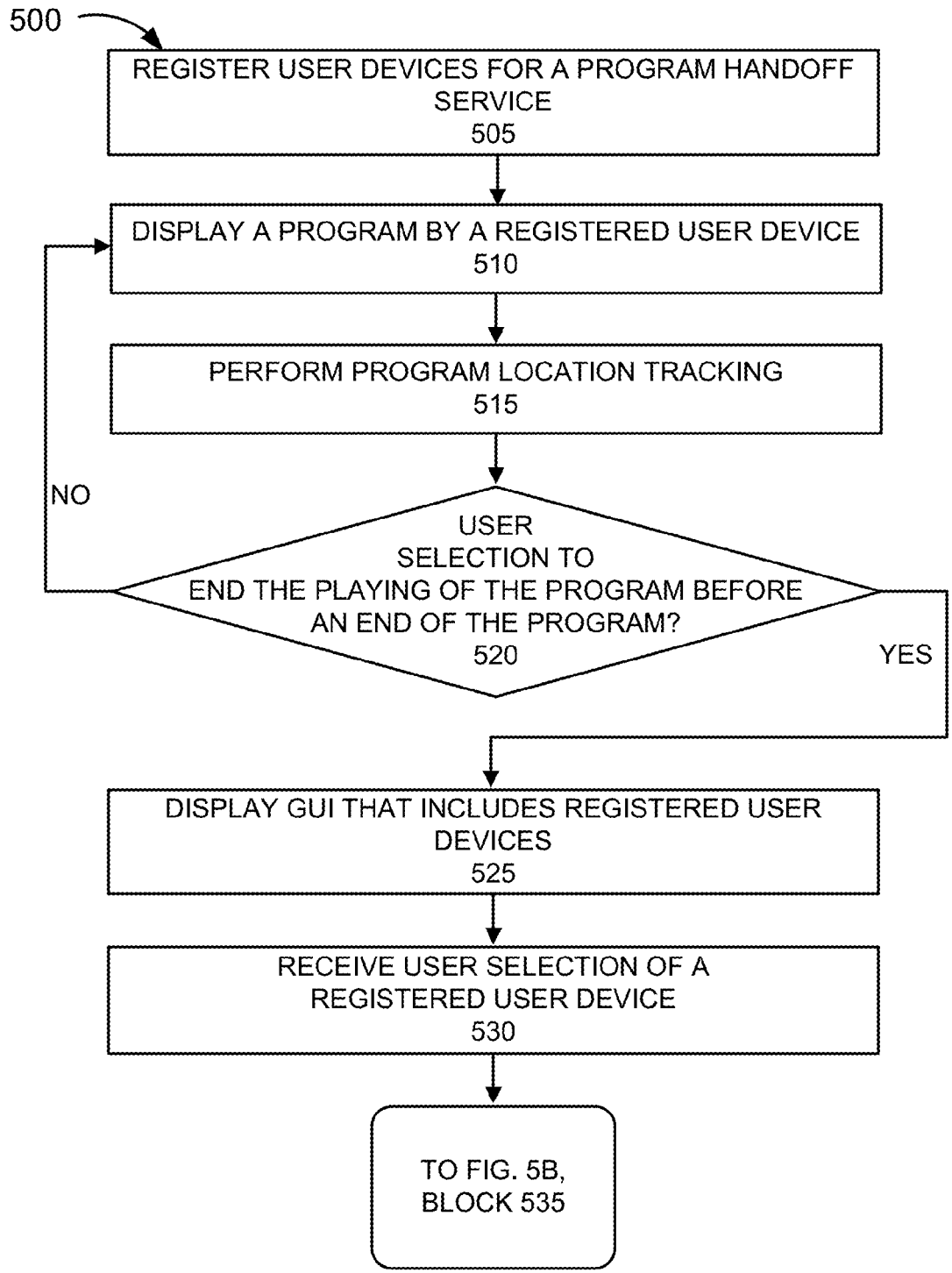
FIGS. 5A-5C are flow diagrams illustrating an exemplary process for performing a program handoff between user devices.
Figure 5B:
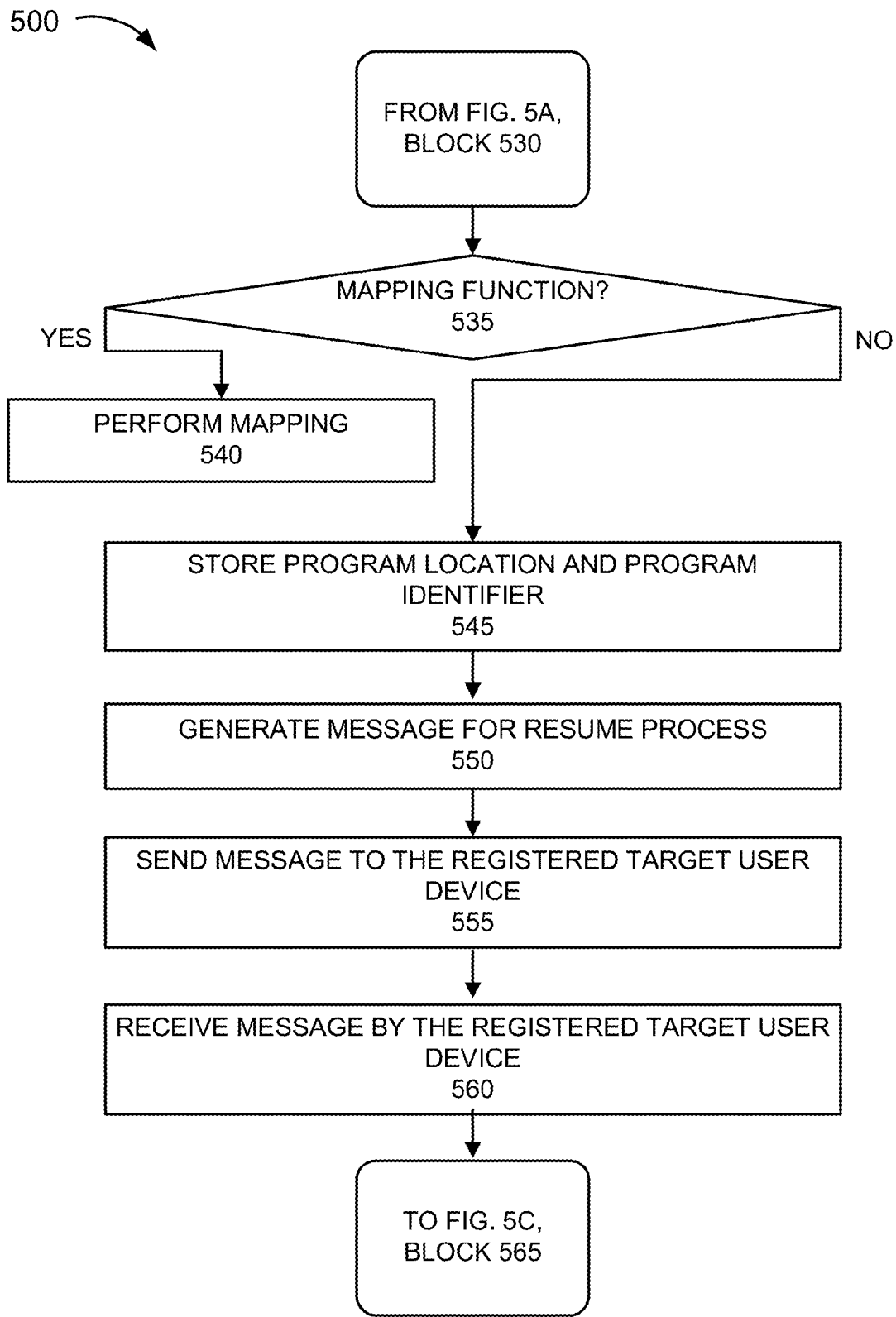
Figure 5C:
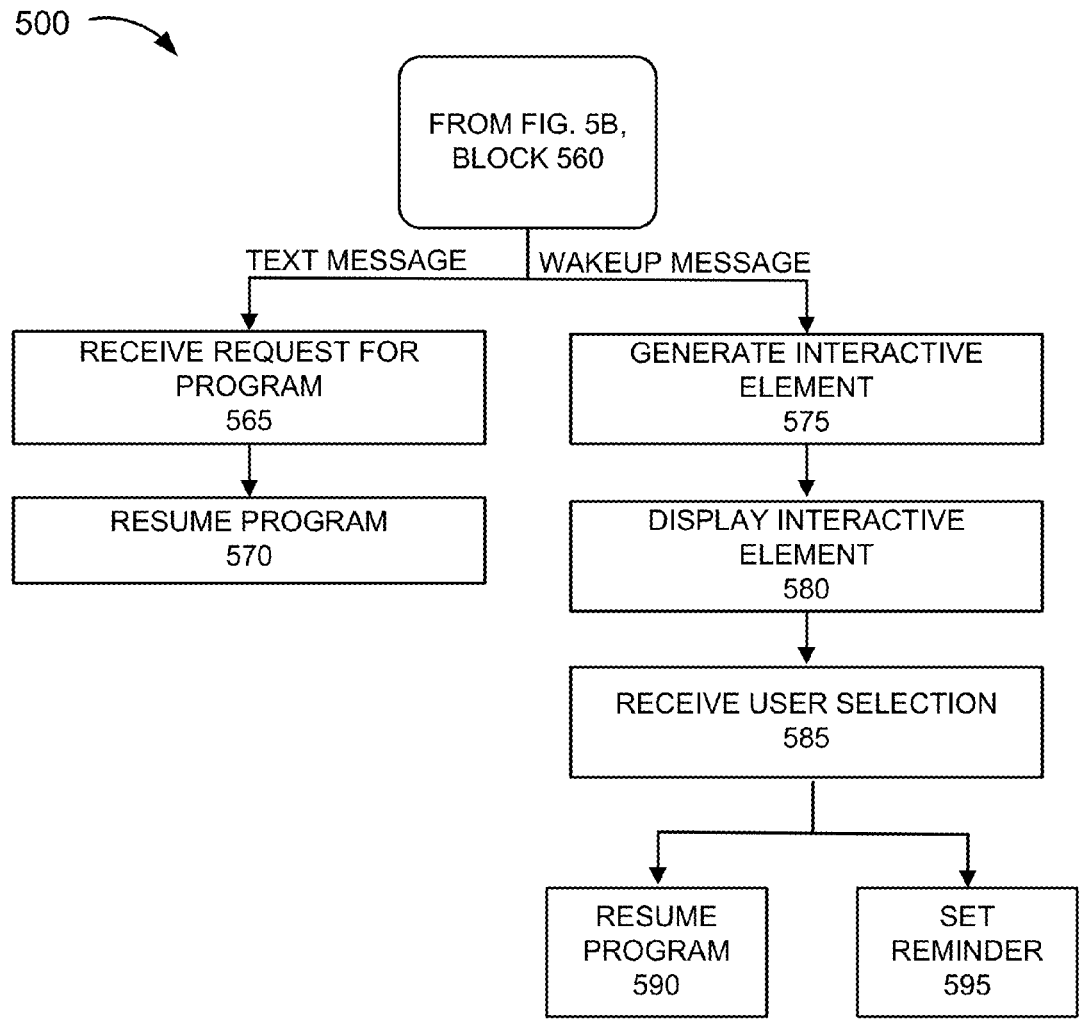

FIGS. 5A-5C are flow diagrams illustrating an exemplary process 500 for performing a program handoff between user devices. According to an exemplary embodiment, devices illustrated in environment 200 may perform steps described in process 500.

In block 505, user devices for a program handoff service are registered. For example, registration device 230 obtains registration information pertaining to the program handoff service. The registration information may include information pertaining to a user, user devices, and other information pertaining to the delivery and playing of programs (e.g., connection speed, etc.).

In block 510, a program is displayed by a registered user device. For example, a registered user device 250 receives a selection of a program to play. Network 205 delivers the program (e.g., streaming, downloading) to user device 250. Depending on user device 250 (e.g., a computer, a smartphone, etc.), user device 250 may include a program player (e.g., a media player) or some other application to permit the program to play on user device 250.

In block 515, program location tracking of the program is performed. For example, according to this example of process 500, program location capture device 210 tracks the program location of the program, as the program is delivered to user device 250 or being viewed by the user.

In block 520, it is determined whether a user selection to end the playing of the program before an end of the program is received. For example, program location capture device 210 continuously monitors whether user device 250 stops or pauses the playing of the program, or exits or quits a program player or other application. If a user selection is not received (block 520-NO), the registered user device continues to play the program and perform program location tracking, as illustrated in blocks 510 and 515. If a user selection is received (block 520-YES), a graphical user interface that includes registered user device is displayed (block 525). For example, an interactive graphical element is displayed to the user to request whether the user would like to resume the program. In this example, it is assumed that the user would like to resume the program on another user device 250. An interactive element is displayed to permit the user to select another registered user device 250 (e.g., interactive element 405).

In block 530, a user selection of a registered user device is received. For example, user device 250 receives the user's selection of a registered target user device 250 via interactive element 405.

Referring to FIG. 5B, in block 535, it is determined whether a mapping function is to be performed. For example, program mapping device 220 determines whether the program format of the program should be mapped based on the user selection of registered target user device 250. Program mapping device 220 makes a determination based on program mapping information stored in a database (e.g., database device 215).

If it is determined that a mapping function is to be performed (block 535-YES), a mapping is performed (block 540). For example, program mapping device 220 selects the suitable program format for registered target user device 250. Program mapping device 220 identifies the program location given the selected program format of the program and the program location information. Program mapping device 220 stores the mapped program location and program identifier in a database (e.g., database device 215).

If it is determined that a mapping function is not to be performed (block 535-NO), a program location and a program identifier is stored (block 545). For example, program mapping device 220 stores a program location and a program identifier pertaining to the program in a database (e.g., database device 215).

In block 550, a message for a resume process is generated. For example, a text message or a wakeup message is generated. The text message or the wakeup message may be generated by program resume device 225 or user device 250. The text message or the wakeup message includes a program location and a program identifier. The message may also include other types of information (e.g., a user identifier, a target user device identifier, etc.). In other words, the message may include a link to a program location capture device 210 or a program delivery device 305 that permits registered target user device 250 to connect to network 205 and resume the program at a resume point in the program.

In block 555, the message is sent to the target registered user device. For example, program resume device 225 or user device 250 transmits the message to registered target user device 250. In block 560, the message is received by the registered target user device. For example, registered target user device 250 receives the message from network 205. In some cases, the message may be received via a message server (e.g., an SMS server, an e-mail server, an MMS server, etc.).

Referring to FIG. 5C, according to this example, as previously described, the message may be implemented as a text message or a wakeup message. In blocks 565 and 570, it is assumed that the message is a text message. As illustrated in block 565, a request for the program is received. For example, the text message is opened by the user. The user selects a link included in the text message. In block 570, the program is resumed. For example, registered target user device 250 displays the program to the user beginning at the program location (i.e., a resume point).

In blocks 575-595, it is assumed that the message is a wakeup message. As illustrated in block 575, an interactive element is generated. For example, when the wakeup message is received, registered target user device 250 generates an interactive element (e.g., interactive element 450). In block 580, the interactive element is displayed. For example, registered target user device 250 displays the interactive element (e.g., interactive element 450).

In block 585, a user selection is received. For example, registered target user device 250 receives a selection, via interactive element 450, to resume the program or set a reminder.

In block 590, the program is resumed. For example, when the user selects to resume the program, the program is resumed. In block 595, a reminder is set. For example, when the user selects to set a reminder, the user may set a reminder via an interactive element (e.g., interactive element 455).

Although FIGS. 5A-5C illustrate an exemplary process 500 for performing a program handoff, according to other embodiments, process 500 may include additional operations, fewer operations, and/or different operations than those illustrated in FIGS. 5A-5C and described herein. For example, the display of the interactive element(s) based on the pausing or the stopping of the playing of the program may be a user preference. In this way, the user may avoid unnecessary prompting pertaining to the program handoff service each time the user pauses or stops the playing of the program. As an alternative, the user may invoke the display of the interactive element(s) through a graphical user interface, pressing a button on a remote control (e.g., in a set top box and television scenario), or some other suitable manner.

According to an exemplary embodiment, a network offloading service provides a network offloading from one network to another network during a communication session. According to an exemplary embodiment, the communication session includes program delivery of a program. Referring back to FIG. 1, according to an exemplary scenario, a user of user device 150 (e.g., a mobile device) may be viewing a program that is attached to network 105 (e.g., a mobile network, such as, an LTE network, etc.). Thereafter, while viewing the program, the user returns home. At such time, the program delivery of the program is switched from network 105 (e.g., the mobile network) to network 105 (e.g., the user's home wireless network, such as, a WiFi network). According to another exemplary scenario, the network offloading of a program includes switching from the user's home wireless network to a mobile network.

According to an exemplary embodiment, user device 150 includes multiple wireless communication interfaces. For example, user device 150 includes a mobile network communication interface, such as a Global System for Mobile Communications (GSM) interface, a Universal Mobile Telecommunication System (UMTS) interface, a Wideband Code Division Multiple Access (WCDMA) interface, an Evolution Data Optimized (EV-DO) interface, an Evolved High-Speed Packet Access (HSPA+) interface, or an LTE interface. Additionally, for example, user device 150 includes a wireless local area network interface, such as a WiFi interface.

According to an exemplary embodiment, when a user uses a program delivery service, the user is authenticated. According to an exemplary embodiment, when the user enters his/her user credentials, the user credentials are stored by user device 150. According to an exemplary embodiment, when user device 150 switches from one wireless network to another wireless network, user device 150 provides the stored user credentials. In this way, the user may not have to re-input user credential data. According to an exemplary embodiment, when the user quits a mobile application pertaining to the program delivery service, the stored user credentials are deleted. In this way, issues pertaining to privacy, security, etc., are maintained.

According to an exemplary embodiment, when a user begins to view a program, a mobile application of user device 150 buffers program data associated with the program. When a user switches from one wireless network (e.g., a mobile network) to another wireless network (e.g., a wireless local area network), the network offload is managed, at least in part, at the application layer (e.g., the mobile application that plays the program). For example, during a network offloading process, the user may view buffered program data. The duration of the program that is buffered depends on the amount of time needed to complete the network offload. According to an exemplary embodiment, the amount of program data buffered or a duration that the program is buffered is based on a network offload prediction time. According to another exemplary embodiment, an advance network offload notification is used to minimize the amount of program data buffered or the duration that the program is buffered.

Figure 6:
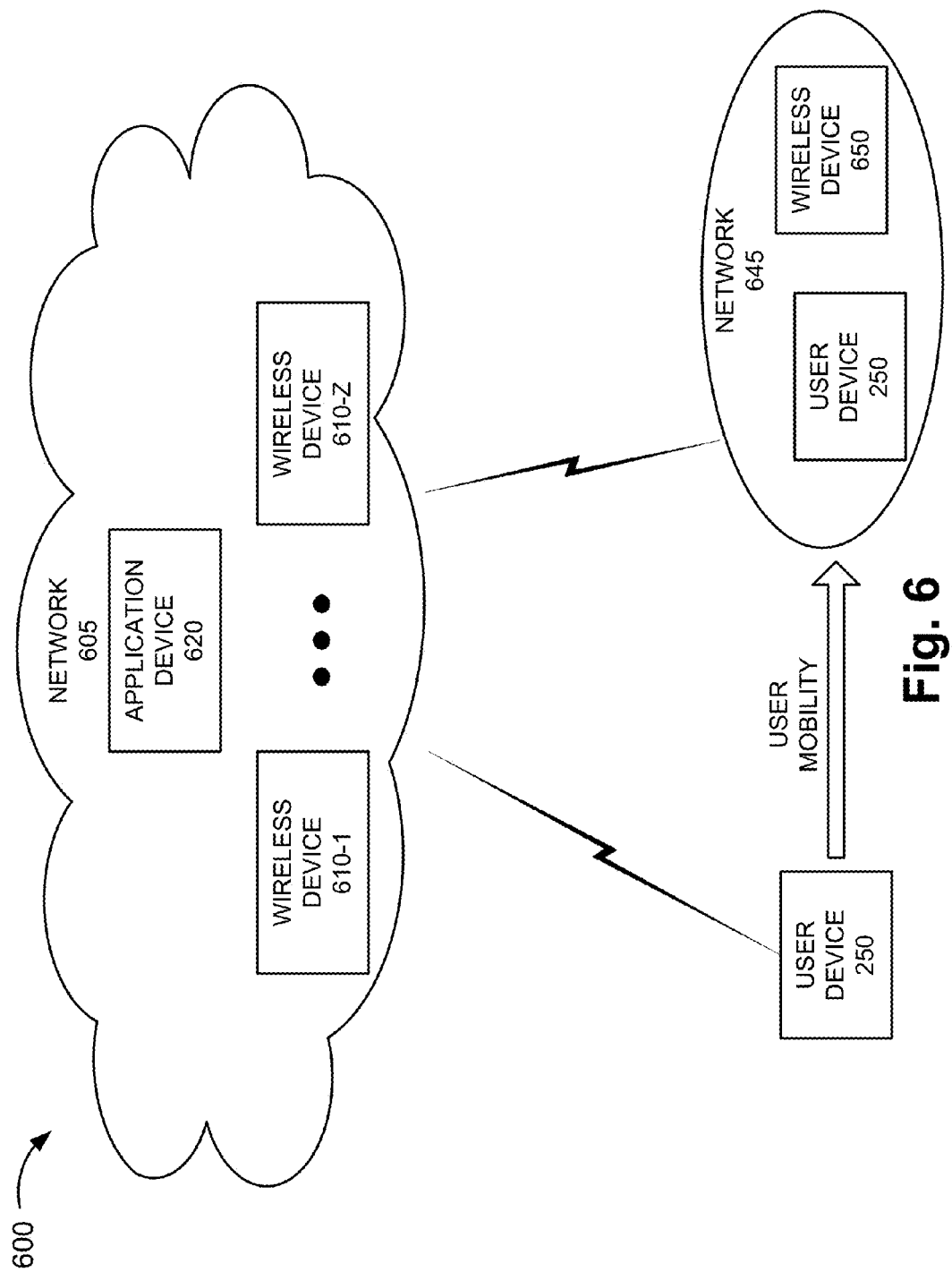
FIG. 6 is a diagram illustrating another exemplary environment in which an exemplary embodiment for application layer-based network offloading of programs may be implemented.

FIG. 6 is a diagram illustrating another exemplary environment in which an exemplary embodiment for application layer-based network offloading of programs may be implemented. As illustrated, environment 600 includes a network 605 including wireless devices 610-1 through 610-Z, in which Z>1 (referred to as wireless devices 610 or wireless device 610), and an application device 620. Environment 600 also includes user device 250 and a network 645 including a wireless device 650.

The number of devices and networks, and the configuration in environment 600 are exemplary and provided for simplicity. According to other embodiments, environment 600 may include additional devices, fewer devices, different devices, and/or differently arranged devices, than those illustrated in FIG. 6.

According to other embodiments, a single device may be implemented as multiple devices and/or multiple devices may be implemented as a single device. A device may be implemented according to a centralized computing architecture or a distributed computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices. By way of example, one or more functions and/or processes described as being performed by application device 620 may be performed by user device 250, or vice versa, or in combination.

Network 605 includes a wireless network that provides mobile service. Network 605 provides users with a program delivery service including network offloading. Network 605 may also include networks that provide other services, such as Internet service.

Wireless devices 610 include network devices having wireless communicative capabilities that provide access to network 605. For example, wireless device 610 may be implemented as a base station (BS), an enhanced Node B (eNB), etc.

Application device 620 includes a network device that supports various services related to user connections with network 605 and mobile service including program delivery. For example, application device 620 may provide or support user authentication, authorization, and billing. Application device 620 may also provide or support program delivery services. For example, application device 620 may facilitate program delivery of programs to user device 250. Application device 620 may also provide or support network offloading. Application device 620 may be implemented as a computational device, such as a server device, an application server, an Authentication, Authorization, and Accounting (AAA) device, and/or other suitable network device(s).

Network 645 includes a wireless network. For example, network 645 may include an Institute of Electrical and Electronics Engineers (IEEE) 802.X network, a High Performance Radio LAN2 (HiperLAN2), or an Ultra Wide Band network. Network 645 provides access to network 605. Wireless device 650 includes a wireless device that provides access to network 645. For example, wireless device 650 may be implemented as a wireless router or other type of wireless access point.

According to an exemplary embodiment, user device 150/250 manages program session continuity during network offloading. For example, user device 250 may store user credential data for re-authentication when user device 250 switches from one wireless network to another wireless network. Additionally, for example, user device 250 may buffer program data to account for a network offloading time. In this way, the program session may continue with no or little interruption. A further description is provided below.

Figure 7:
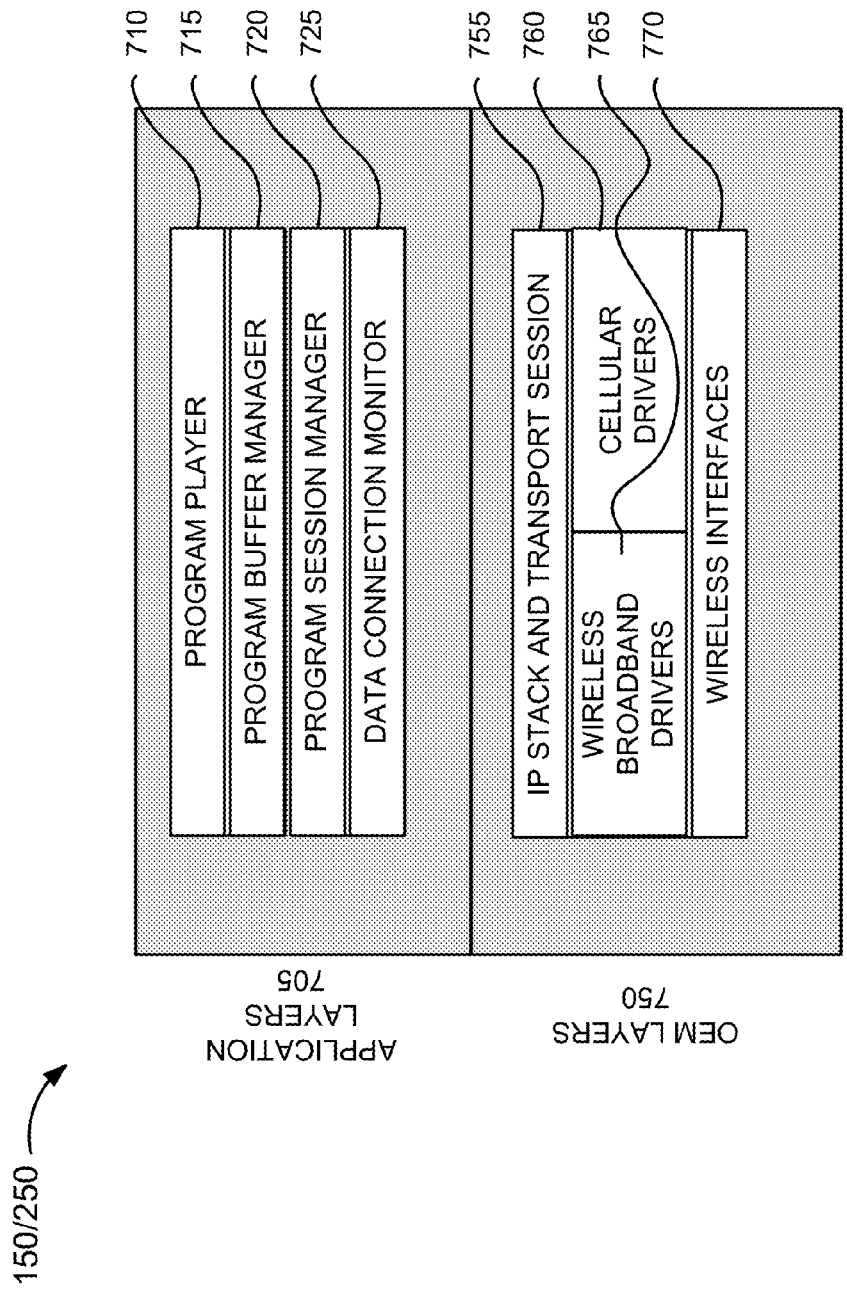
FIG. 7 is a diagram illustrating exemplary functional components of a user device.

FIG. 7 is a diagram illustrating exemplary functional components of user devices 150/250. As illustrated, user devices 150/250 include application layers 705 and original equipment management (OEM) layers 750. Application layers 705 include a program player 710, a program buffer manager 715, a program session manager 720, and a data connection monitor 725. OEM layers 750 include an Internet Protocol (IP) stack and transport session 755, a cellular driver 760, a wireless broadband driver 765, and a wireless interface 770. According to other embodiments, user devices 150/250 may include additional functional components, fewer functional components, and/or different functional components.

Program player 710 includes a multimedia player that is capable of playing programs (e.g., audio and visual content). Program buffer manager 715 manages the buffering of a program. As described further below, program buffer manager 715 may buffer a program based on a network offload time. Program session manager 720 manages the program session between user devices 150/250 and networks 105/605/

645. According to an exemplary embodiment, program session manager 720 tracks the position of a program during the playing of the program. Program session tracking information may be used when user devices 150/250 change, for example, from one wireless network (e.g., network 605) to another wireless network (e.g., network 645), or vice versa, during a network offloading process. According to another embodiment, application device 620 performs program session tracking. Data connection monitor 725 monitors the state of a connection between user devices 150/250 and a wireless network (e.g., network 605, network 645, etc.). Data connection monitor 725 identifies when wireless networks are available for connection. As described further below, data connection monitor 725 manages advance network offloading notifications, which may be used to minimize the amount or the duration of buffering of a program.

IP stack and transport session 755 includes network protocols associated with an IP/Transport Control Protocol (IP/TCP) stack. Cellular drivers 760 include a driver application or a driver program for a mobile connection to a wireless network (e.g., CDMA, UMTS, etc.). Wireless broadband drivers 765 include a driver application or a driver program pertaining to a wireless connection to a wireless network (e.g., WiFi, LTE, etc.). Wireless interfaces 770 include an application or a program for wireless connection (e.g., a radio connection, etc.) via a wireless transmitter and a wireless receiver, or a wireless transceiver.

Figure 8A:
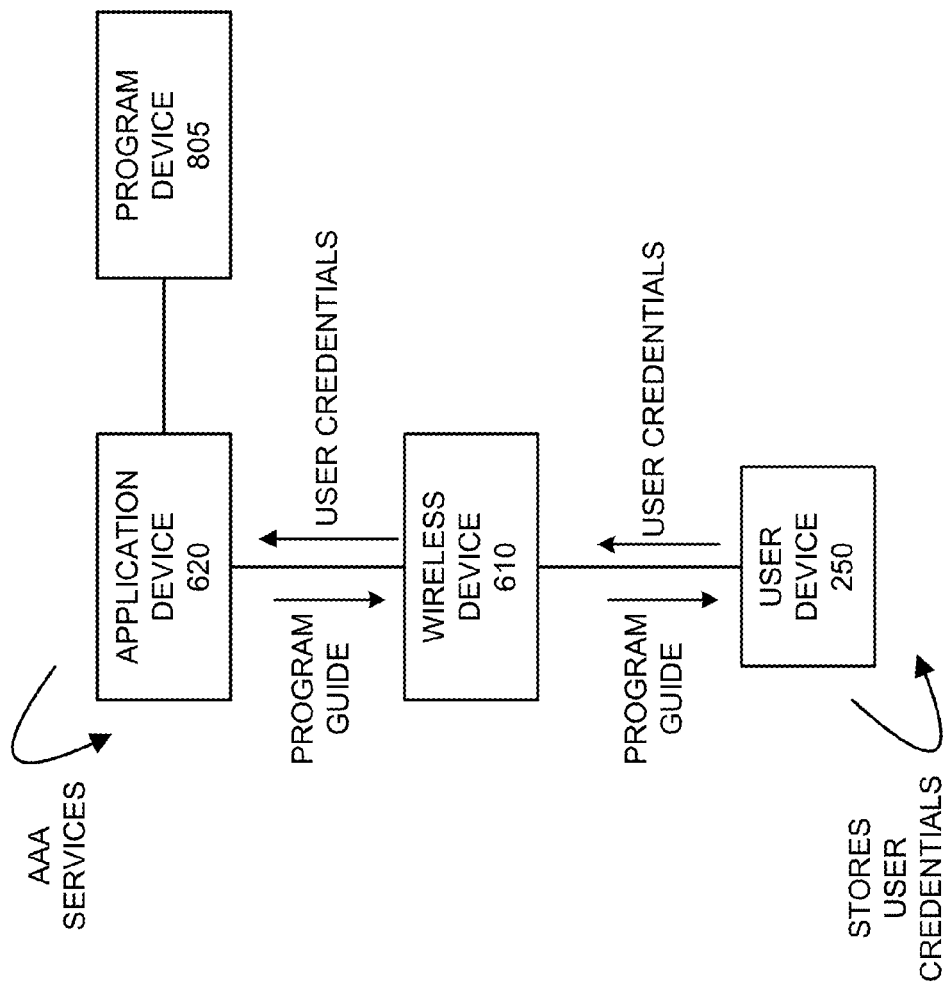
FIGS. 8A-8D illustrates an exemplary application layer-based network offloading of programs process performed in an exemplary environment.

Described below is an exemplary process for performing application layer-based network offloading. FIGS. 8A-8D illustrates an exemplary application layer-based network offloading programs process performed in environment 600. Referring to FIG. 8A, assume that a user of user device 250 establishes a connection with network 605 via wireless device 610. After a connection is established, the user launches a mobile application and connects to application device 620. The user is prompted for credentials and the user inputs his/her user credentials. As illustrated, the user credentials are transmitted to application device 620. Additionally, the user credentials are stored by user device 250.

Application device 620 authenticates and authorizes the user/user device 250. After the authentication and authorization process, application device 620 provides user device 250 with a graphical user interface (e.g., a program guide) to permit the user to select a program for viewing.

Figure 8B:
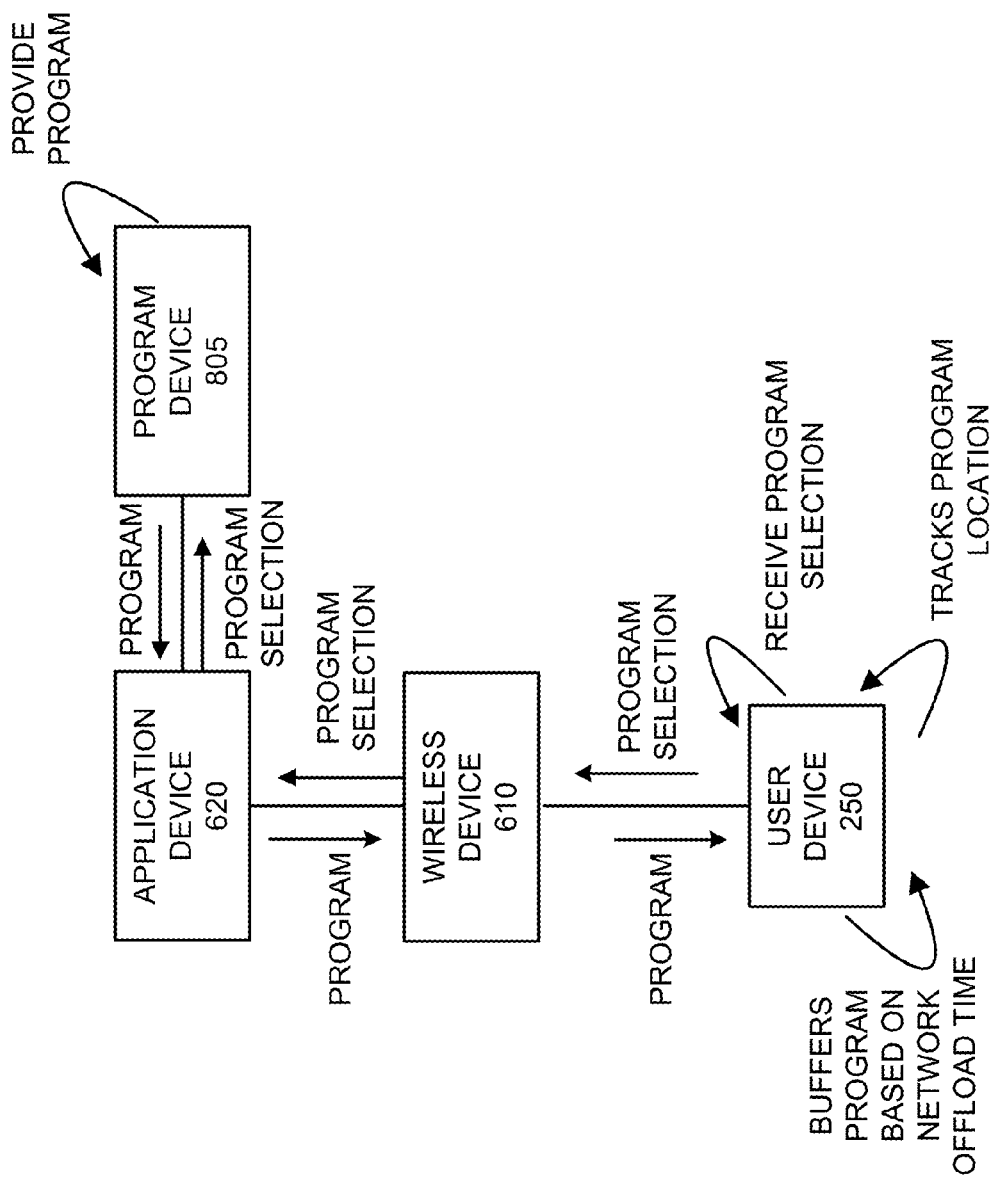

Referring to FIG. 8B, the user makes a selection of a program via the graphical user interface. User device 250 receives the program selection and transmits the program selection to application device 620. Application device 620 provides the program selection to a program device 805. For example, program device 805 stores programs and is part of a program delivery network. In response to the program selection, program device 805 provides the program to user device 250. As illustrated, user device 250 (e.g., program buffer manager 715) buffers the program based on a network offload time. For example, program buffer manager 715 may buffer based on a time property (e.g., 15 seconds, etc.) and/or an amount of data property (e.g., so many bytes, etc.). According to an exemplary embodiment, program buffer manager 715 buffers the program when the program is first received. During this time, the user may not view the program. The buffer is continuously filled thereafter so if a network offloading event occurs, user device 250 (e.g., program player 710) may continue to play the program from a buffer (e.g., a memory) while the network offloading takes place and the streaming or downloading of the program has temporarily stopped.

As further illustrated in FIG. 8B, user device 250 (e.g., program session manager 720) tracks the location of the program to generate program location information. According to an exemplary implementation, the program location information indicates the position of the program (e.g., a time, a program data marker (e.g., a program chunk, a byte or byte range, etc.), etc.) viewed by the user. According to another implementation, the program location information indicates the position of the program received by user device 250. During this time, program player 710 plays the program as it is received (e.g., streamed, downloaded) to permit the user to view the program.

Figure 8C:
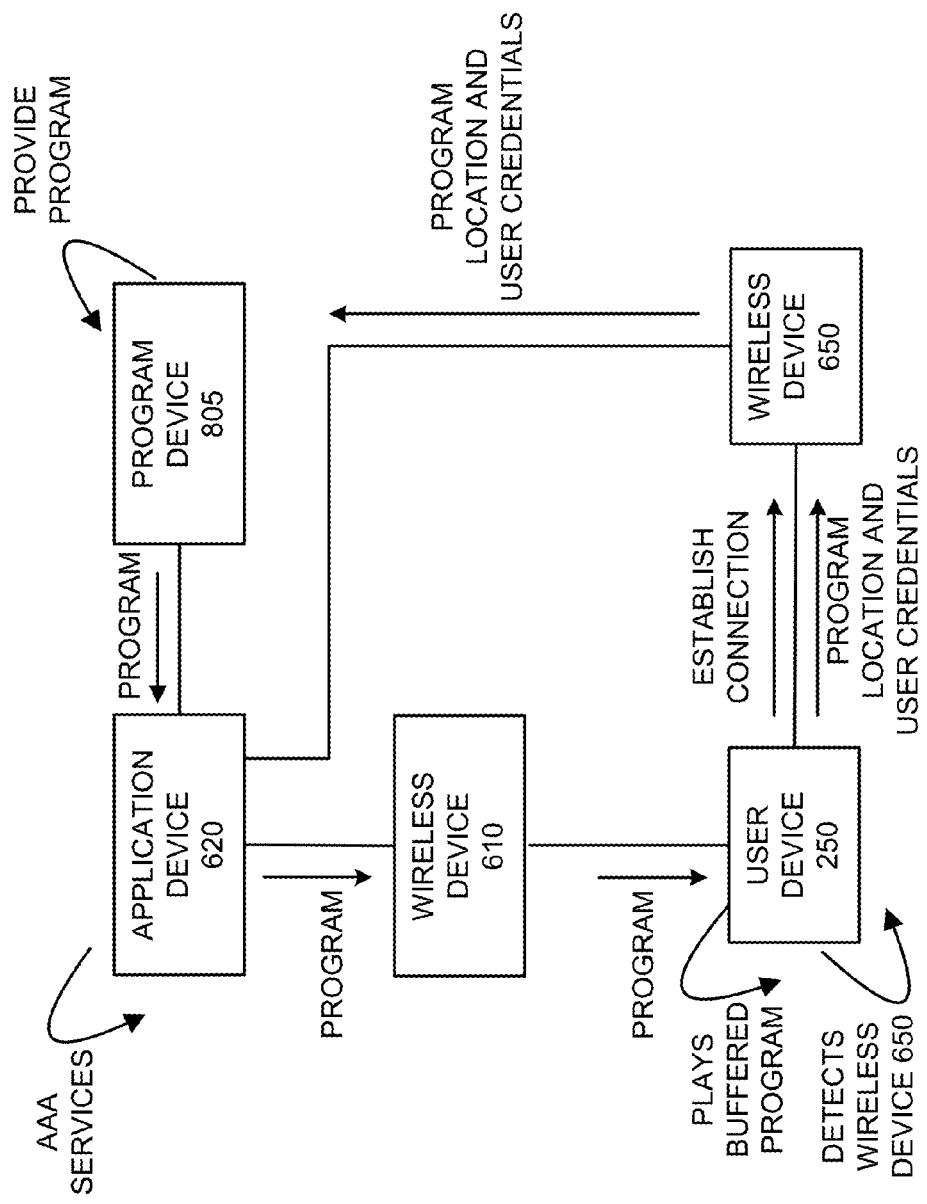

According to an exemplary scenario, assume the user is traveling to his/her home or place of work. Referring to FIG. 8C, when the user is within a certain distance from wireless device 650, user device 250 (e.g., data connection monitor 725) detects the presence of wireless device 650 (e.g., via OEM layers 750 and/or via an operating system of user device 250). According to an exemplary implementation, data connection monitor 725 includes connection priority rules that govern an invocation of network offloading. The connection priority rules may be user-configured and/or service provider configured. The connection priority rules may give priority of one or more wireless networks relative to other wireless network(s). For example, according to an exemplary situation, assume the user is receiving the program via an LTE connection. The user may have a subscription (e.g., a data plan) that allows for a certain amount of data before excess fees are applied. Under such circumstances, the connection priority rules may dictate that when network 645 (e.g., a WiFi network) via wireless device 650 is available, data connection monitor 725 will initiate a network offload. Additionally, or alternatively, the connection priority rules may be based on other types of performance metrics or user-related preferences. For example, under some circumstances, wireless device 650 may provide more bandwidth to user device 250 than an LTE network.

As illustrated in FIG. 8C, user device 250 establishes a connection with network 645 via wireless device 650. In this example, it is assumed that user device 250 is unable to be simultaneously connected to multiple networks. However, according to other embodiments of user device 250, user device 250 may be capable of being simultaneously connected to multiple networks (e.g., network 605 and network 645). During the connection establishment process, user device 250 (e.g., program player 710) plays the program data stored in a buffer. Once user device 250 establishes a connection with network 645, user device 250 (e.g., program session manager 715) establishes a connection with application device 620 to resume the playing of the program. As illustrated in FIG. 8C, user device 250 may transmit user credential data and/or program location information that indicates a program location subsequent to the buffered program data.

Figure 8D:
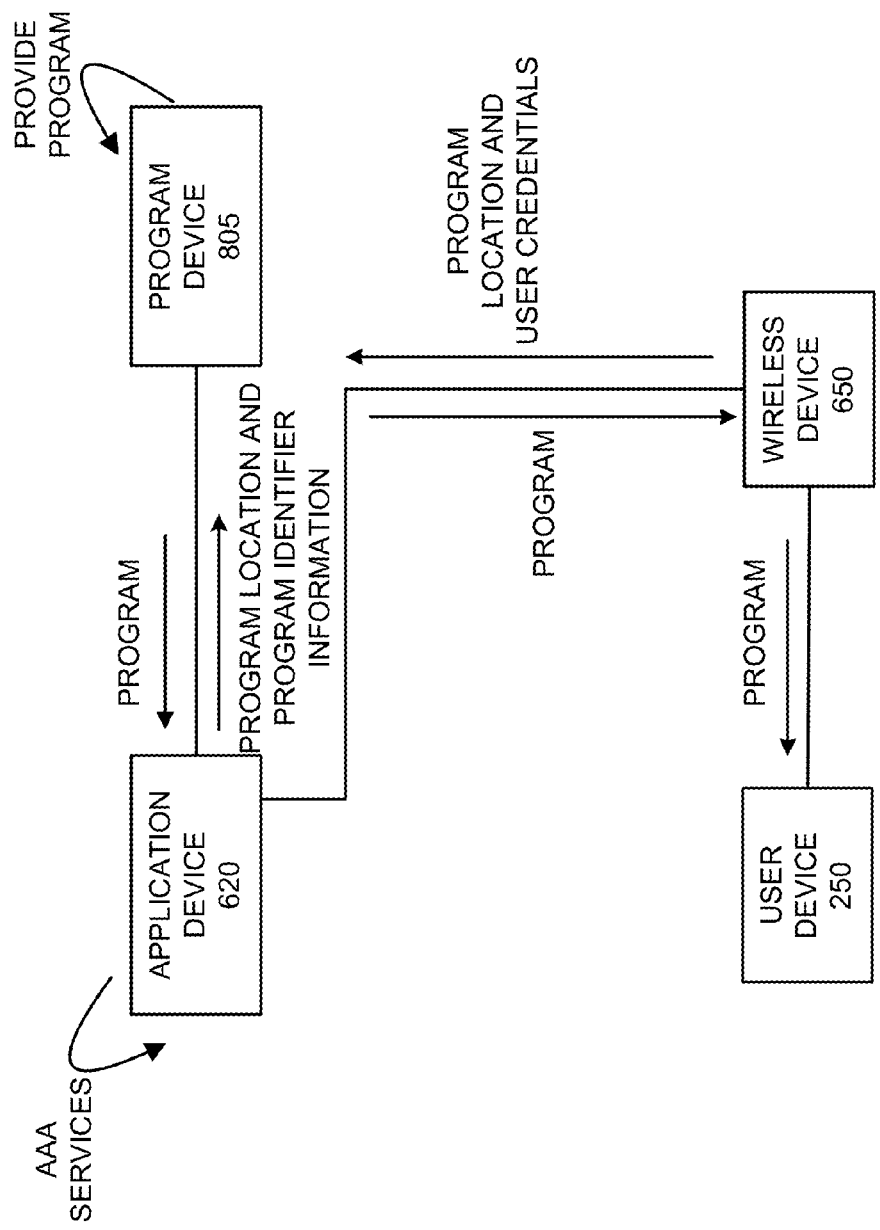

Referring to FIG. 8D, application device 620 performs authentication and/or authorization services using the user credential data. Additionally, application device 620 provides program device 805 with program location and program identifier information (e.g., program identifier is known to application device 620) to program device 805. User device 250 establishes a program session with program device 805. Program device 805 continues to provide the program to user device 250 beginning at the program location subsequent to the buffered program data location. User device 250 continues to play the program after the network offloading process is completed via network 645 (e.g., via wireless device 650).

According to an exemplary embodiment, user device 250 identifies the position of user device 250 relative to the boundaries of network 645. For example, user device 250 may calculate user position based on a Global Positioning System (GPS) or other suitable location-aware system. User device 250 may predict when a network offloading may take place based on a speed and a direction associated with the user's mobility and current position relative to the boundaries of network 645. According to an exemplary implementation, the boundaries or geographic wireless connection reach of network 645 may be based on (initial) wireless detection of network 645 and the positions of user device 250 when the (initial) detection(s) of network 645 occurs. According to another implementation, the position of wireless device 650 may form a basis to calculate a radius of the wireless connection reach of network 645 and corresponding positional reach. In either case, according to an exemplary embodiment, application layers 705 receives an advanced network offloading notification (e.g., an application programming interface (API) level notification, such as an OEM API level notification, to permit user device 250 to initiate a wireless connection with network 645.

According to an exemplary embodiment, user device 250 may transmit an advanced network offloading alert to application device 620. The network offloading alert may include a predictive program location based on a current position of the user relative to a boundary of network 645 and predictive time factors. By way of example, the predictive time factors may include the duration of time when user device 250 may establish a connection with network 645 and the duration of time program will continue to play before connection with network 645 is established. In response to receiving the advanced network offloading alert, application device 620 transmits the predictive program location and program identifier information.

During the network offloading, user device 250 (e.g., program player 710) plays the program from the buffer. According to this example, the amount of program data or the duration of the buffering of program data may be reduced, since user device 250 and/or network 605 may prepare for the network offloading while simultaneously delivering the program via network 605.

According to other embodiments, advanced network offloading notification is not used. Rather, user device 250 detects when network offloading is to be performed based on conventional methods of detection of an available network in combination with the connection priority rules.

According to the exemplary network offloading processes illustrated and described in relation to FIGS. 8A-8D, interruption of program delivery may be minimized. The network offloading is accomplished, at least in part, at the (mobile) application layer based on the program buffering by user device 250. Although FIG. 8A through FIG. 8D illustrate exemplary devices and messages, according to other embodiments, the messages and/or the devices may be different. For example, depending on the type of network and the network devices therein, the functionalities assigned to each network device, etc., various modifications may be implemented.

Figure 9:
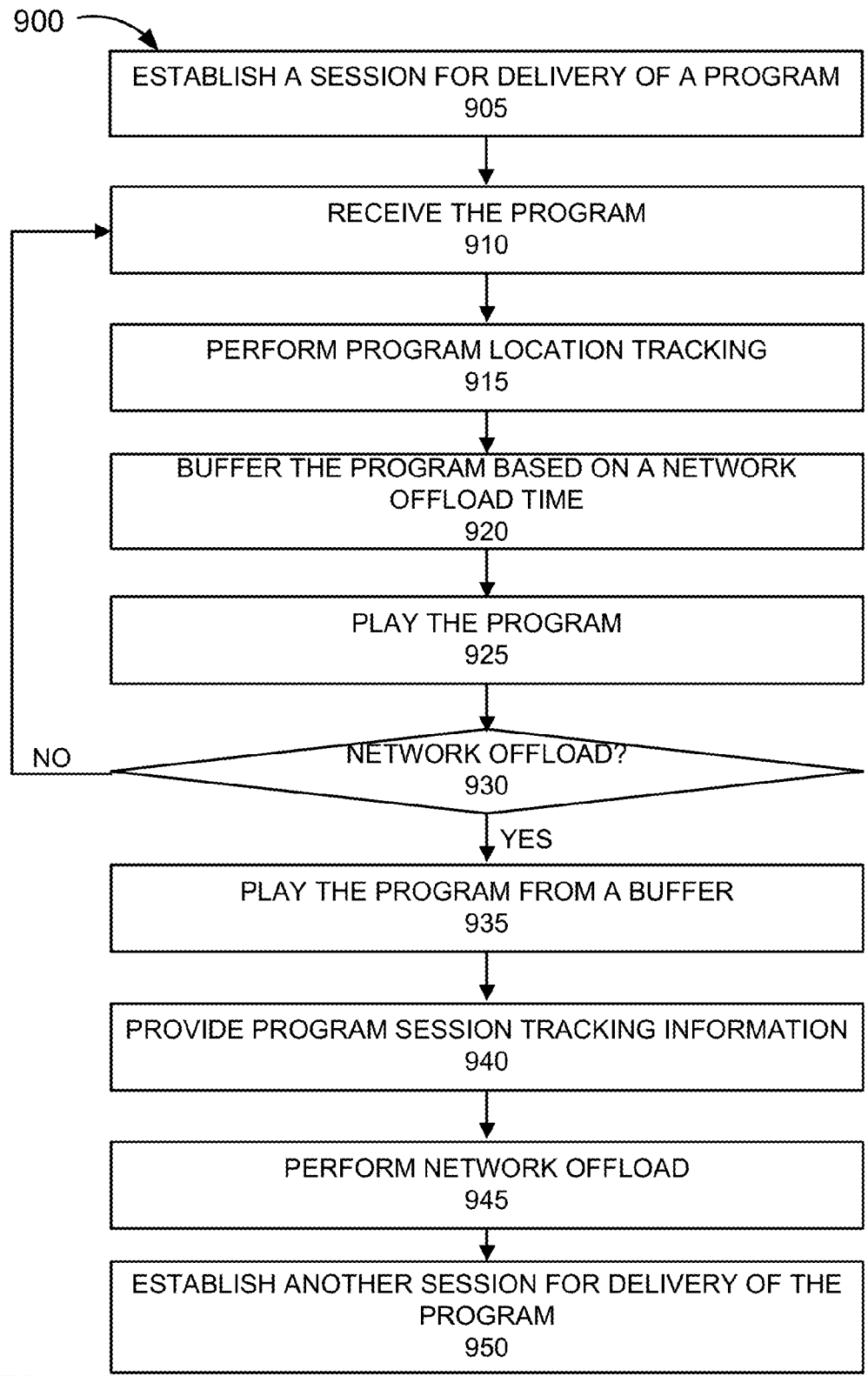
FIG. 9 is a flow diagram illustrating an exemplary application layer-based network offloading of programs process.

FIG. 9 is a flow diagram illustrating an exemplary application layer-based network offloading of a program process 900. According to an exemplary embodiment, user device 250 may perform one or more of the steps described in process 900.

Referring to FIG. 9, in block 905, a session for delivery of a program is established. For example, user device 250 negotiates and establishes a wireless connection with network 605. User device 250 establishes a program session via network 605 for the delivery of a program In block 910, the program is received. For example, user device 250 receives a user selection of a program via a graphical user interface. User device 250 begins to receive the program selected by a user.

In block 915, program location tracking is performed. For example, user device 250 (e.g., program session manager 720) tracks a time position, a program data position (e.g., a program chunk, a byte range, etc.), or other suitable marker related to the streaming or downloading of the program.

In block 920, the program is buffered based on a network offloading time. For example, user device 250 (e.g., program buffer manager 715) buffers a portion of the program equivalent to a network offloading time. For example, the network offloading time may correspond to an amount of program data or a playing time of the program sufficient for a network offloading from one wireless network to another wireless network to be completed. According to an exemplary implementation, the network offloading time may be a preconfigured value. As previously described, depending on whether advanced network offloading notification is used, the amount of program data or the buffering time vis-à-vis the network offloading time may vary.

In block 925, the program is played. For example, user device 250 plays the program via an application (e.g., program player 710).

In block 930, it is determined whether network offloading is to be performed. For example, user device 250 (e.g., data connection monitor 725) may identify when a network offloading is to be performed based on detection of an available wireless network and connection priority rules. Alternatively, user device 250 may initiate, in advance, a network offloading, as previously described.

If it is determined that a network offload is not to take place (block 930-NO), then process 900 continues to block 910. That is, user device 250 continues to receive the program, perform program location tracking, and buffer the program. If it is determined that a network offload is to take place (block 930-YES), then the program is played from a buffer (block 935). For example, user device 250 (e.g., program player 710) plays a portion of the program that has been buffered.

In block 940, program location information is provided. For example, user device 250 provides program location information (e.g., a position of the program) to a network device (e.g., application device 620). User device 250 may also provide a program identifier and/or other information (e.g., user credential data, etc.) to application device 620.

In block 945, the network offload is performed. For example, user device 250 and network 205 coordinate a network offload. By way of example, user device 250 disconnects from one wireless network (e.g., network 605) and connects to another wireless network (e.g., network 645).

In block 950, another session for delivery of the program is established. For example, user device 250 establishes a program session with program device 805 for receiving the program. User device 250 continues to buffer the program based on the newly established connection. User device 250 continues to play the program with no or little interruption of program delivery service.

Although FIG. 9 illustrates an exemplary process 900 for performing an application layer-based network offloading of a program, according to other embodiments, process 900 may include additional operations, fewer operations, and/or different operations than those illustrated in FIG. 9 and described herein. Additionally, some operations described as being performed by user device 250 may be instead performed by a network device, or some combination thereof.

Figure 10:
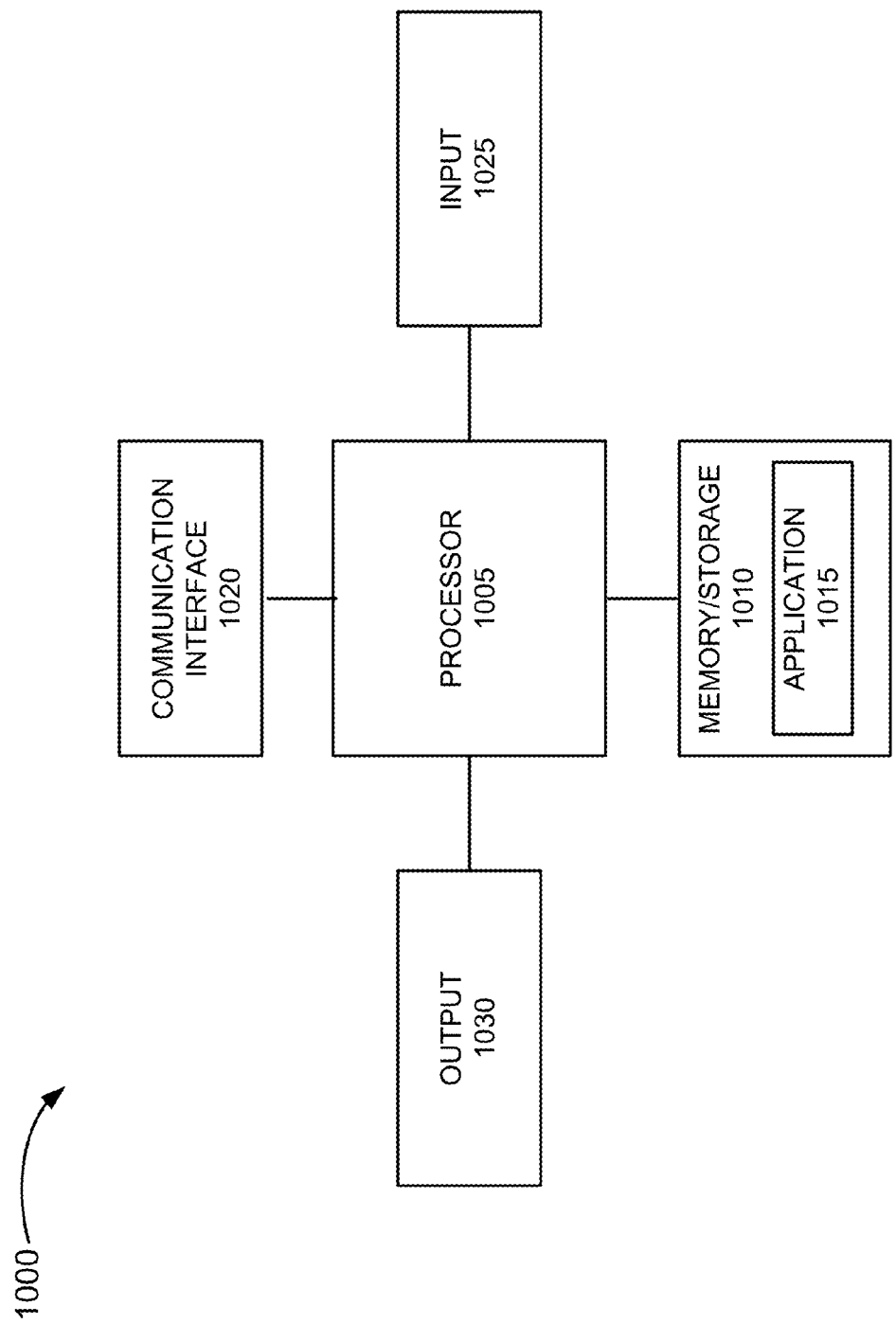
FIG. 10 is a diagram illustrating exemplary components of a device that may correspond to one or more of the devices illustrated in the exemplary environments.

FIG. 10 is a diagram illustrating exemplary components of a device 1000 that may correspond to one or more of the devices illustrated in environments 100, 200, and 600. As illustrated, according to an exemplary embodiment, device 1000 may include a processor 1005, memory/storage 1010 including an application 1015, a communication interface 1020, an input 1025, and an output 1030. According to other embodiments, device 1000 may include fewer components, additional components, different components, and/or a different arrangement of components than those illustrated in FIG. 10 and described herein.

Processor 1005 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 1005 may be implemented as hardware (e.g., a microprocessor, etc.), a combination of hardware and software (e.g., a SoC, etc.), may include one or multiple memories (e.g., memory/storage 1010), etc.

Processor 1005 may control the overall operation or a portion of operation(s) performed by device 1000. Processor 1005 may perform one or multiple operations based on an operating system and/or various applications (e.g., application 1015). Processor 1005 may access instructions from memory/storage 1010, from other components of device 1000, and/or from a source external to device 1000 (e.g., a network, another device, etc.).

Memory/storage 1010 includes one or multiple memories and/or one or multiple other types of storage mediums. For example, memory/storage 1010 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 1010 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 1010 may include drives for reading from and writing to the storage medium.

Memory/storage 1010 may be external to and/or removable from device 1000, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 1010 may store data, application(s), and/or instructions related to the operation of device 1000.

Application 1015 may include software or a program that provides various services and/or functions. For example, with reference to network devices 110 and according to an exemplary embodiment, application 1015 may include one or multiple applications or programs that provide program delivery services, as described herein. Additionally, with reference to user device 150/250 and according to an exemplary embodiment, application 1015 may include one or multiple applications (e.g., functions associated with application layers 705, etc.), as described herein.

Communication interface 1020 permits device 1000 to communicate with other devices, networks, systems, etc. Communication interface 1020 may include one or multiple wireless interfaces. Communication interface 1020 may include one or multiple transmitters, receivers, and/or transceivers. Communication interface 1020 may operate according to one or multiple protocols, standards, and/or the like.

Input 1025 may permit an input into device 1000. For example, input 1025 may include a keyboard, a mouse, a camera, a scanner, a microphone, a display, a touchpad, a touchscreen, a touchless screen, a button, a switch, an input port, voice recognition logic, speech recognition logic, fingerprint recognition logic, a web cam, and/or some other type of visual, auditory, tactile, etc., input component. Output 1030 may permit an output from device 1000. For example, output 1030 may include a speaker, a display, a touchscreen, a touchless screen, a light, an output port, and/or some other type of visual, auditory, tactile, etc., output component.

Device 1000 may perform processes and/or functions, as described herein, in response to processor 1005 executing instructions (e.g., application 1015) stored by memory/storage 1010. By way of example, the instructions may be read into memory/storage 1010 from another memory/storage 1010 or from another device via communication interface 1020. The instructions stored by memory/storage 1010 may cause processor 1005 to perform one or more processes described herein. Alternatively, for example, according to other implementations, device 1000 may perform one or more processes described herein based on the execution of hardware (processor 1005, etc.), the execution of hardware and firmware, or the execution of hardware, software, and firmware.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5A, 5B, 5C, and 9, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 1005, etc.), a combination of hardware and software (e.g., application 1015), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
    establishing, by a user device, a connection with a network;
    receiving, by the user device, a video program via the network;
    buffering, by the user device, upon initially receiving the video program and before initially playing the video program, a portion of the video program based on a network offloading time, wherein the network offloading time corresponds to a period of time to complete a network offloading;
    determining, by the user device and subsequent to the buffering, whether the network offloading to another network is to be performed; and
    playing, by the user device, the portion of the video program or a subsequently buffered portion of the video program during an execution of the network offloading, in response to the determining that the network offloading is to be performed, wherein the subsequently buffered portion of the video program is based on the network offloading time.

2. The method of claim 1, wherein the determining comprises:
    storing connection priority rules that indicate a priority of one or more networks for the user device with which to connect;
    detecting a presence of the other network; and
    determining whether the other network is a priority network based on the connection priority rules.

3. The method of claim 1, further comprising:
    identifying a position of a user receiving the video program;
    identifying the position of the user relative to a boundary of the other network;
    identifying a speed and a direction associated with a mobility of the user; and
    predicting whether the network offloading is to be performed based on the user's position, the position of the user relative to the boundary of the other network, and the speed and the direction associated with the mobility of the user.

4. The method of claim 3, wherein the receiving the video program is via a streaming service and wherein the network offloading time is based on a prediction of when the network offloading to the other network is to occur and a time period it takes to execute the network offloading based on the prediction.

5. The method of claim 1, further comprising:
    performing video program location tracking of the video program; and
    transmitting video program location information to the network, wherein the video program location information corresponds to a video program location included in the portion of the video program that is buffered.

6. The method of claim 1, wherein the network includes a mobile network and the other network includes one of a WiFi network, an Ultra Wide Band network, or a High Performance Radio Local Area Network 2 network, and the method further comprising:
    generating an advanced network offloading alert that includes a predictive program location, wherein the predictive program location is calculated based on predictive factors, wherein the predictive factors include a duration of time the video program will continue to play before a connection with the other network is established.

7. The method of claim 1, further comprising:
    buffering, by the user device, one or more other portions of the video program via the network, in response to determining that the network offloading is not to be performed.

8. A mobile device comprising:
    a communication interface;
    one or more memories that store instructions; and
    one or more processors that execute the instructions to:
        store a network offloading time that corresponds to a time for the mobile device to complete a handover between wireless networks;
        establish, via the communication interface, a wireless connection with a wireless network;
        receive, via the communication interface, a video program via the wireless network;
        buffer, upon initially receiving the video program and before initially playing the video program, a portion of the video program based on the network offloading time;
        determine, subsequent to buffering, whether network offloading is to be performed; and
        play the portion of the video program or a subsequently buffered portion of the video program during an execution of the network offloading, in response to a determination that the network offloading is to be performed, wherein the subsequently buffered portion of the video program is based on the network offloading time.

9. The mobile device of claim 8, wherein when receiving the video program, the one or more processors further execute the instructions to:
    receive, via the communication interface, the video program via a streaming service or a downloading service.

10. The mobile device of claim 8, wherein the one or more processors further execute the instructions to:
    identify a position of the mobile device relative to a boundary of another wireless network;
    identify a speed and a direction associated with the mobile device;
    predict whether network offloading is to be performed based on the position of the mobile device relative to the boundary of the other wireless network and the speed and the direction associated with the mobile device;
    generate an advanced network offloading notification in response to a prediction that the network offloading is to be performed; and
    communicate the advanced network offloading notification to a mobile application playing the video program.

11. The mobile device of claim 8, further comprising:
    one or more memories to store connection priority rules that indicate a priority of one or more wireless networks for the mobile device to connect, wherein the one or more processors further execute the instructions to:

detect, via the communication interface, a presence of another wireless network;

determine whether the detected other wireless network is a priority network based on the connection priority rules;

establish, via the communication interface, a wireless connection with the detected other wireless network when the detected other wireless network is the priority network;

release, via the communication interface, the wireless connection with the wireless network; and play the video program from a program location subsequent to the buffered portion of the video program.

12. The mobile device of claim 8, wherein the one or more processors further execute the instructions to:

receive user credential data via a graphical user interface;

transmit, via the communication interface, the user credential data to the wireless network;

store the user credential data;

provide, via the communication interface, the stored user credential data when establishing another wireless connection based on the execution of the network offloading; and receive, via the communication interface, a remaining portion of the video program via the other wireless connection.

13. The mobile device of claim 9, wherein the one or more processors further execute the instructions to:

continue to receive, via the communication interface, the video program via the wireless network in response to a determination that the network offloading is not to be performed.

14. A non-transitory storage medium storing instructions executable by a mobile device, wherein the instructions include instructions for:

storing a network offloading time;

establishing a wireless connection with a network;

receiving a video program from the network;

buffering, upon initially receiving the video program and before initially playing the video program, a portion of the video program based on the stored network offloading time, wherein the network offloading time corresponds to a period of time to complete a network offloading;

determining, subsequent to the buffering, whether the network offloading is to be performed; and playing the portion of the video program or a subsequently buffered portion of the video program during an execution of the network offloading in response to determining that the network offloading is to be performed, wherein the subsequently buffered portion of the video program is based on the network offloading time.

15. The non-transitory storage medium of claim 14, further storing instructions for:

performing video program location tracking of the video program;

storing a video program location; and transmitting the video program location in response to determining that the network offloading is to be performed.

16. The non-transitory storage medium of claim 14, further storing instructions for:

predicting when the network offloading is to be performed based on mobility information associated with the mobile device and a position of the mobile device relative to a priority network.

17. The non-transitory storage medium of claim 14, further storing instructions for:

receiving user credential information;

transmitting the user credential information to the network;

storing the user credential information;

transmitting the user credential information when establishing another wireless connection to continue the playing of the video program after the execution of the network offloading; and deleting the user credential information when the playing of the video program is completed.

18. The non-transitory storage medium of claim 14, further storing instructions for:

storing connection priority rules; and determining whether network offloading is to be performed based on the connection priority rules, wherein the connection priority rules include a rule that provides less priority to one or more mobile networks of which a user of the mobile device is subscribed than one or more local area networks of which the user is authorized to use.

19. The non-transitory storage medium of claim 14, further storing instructions for:

continuing to receive the video program from the network in response to determining that the network offloading is not to be performed.

20. The non-transitory storage medium of claim 14, wherein the video program is received via a streaming service or a downloading service.

* * * * *